United States Patent
Chen

(10) Patent No.: US 8,222,357 B2
(45) Date of Patent: *Jul. 17, 2012

(54) PROCATALYST COMPOSITION WITH MULTIPLE INTERNAL DONOR HAVING SILYL ESTER AND METHOD

(75) Inventor: Linfeng Chen, Sugar Land, TX (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/623,514

(22) Filed: Nov. 23, 2009

(65) Prior Publication Data

US 2010/0130710 A1 May 27, 2010

Related U.S. Application Data

(60) Provisional application No. 61/117,763, filed on Nov. 25, 2008.

(51) Int. Cl.
*C08F 4/50* (2006.01)
(52) U.S. Cl. .................................... 526/125.3
(58) Field of Classification Search ............... 526/125.3
See application file for complete search history.

(56) References Cited

U.S. PATENT DOCUMENTS

| | | | |
|---|---|---|---|
| 4,442,276 A | 4/1984 | Kashiwa et al. | |
| 4,460,701 A | 7/1984 | Terano et al. | |
| 4,540,679 A | 9/1985 | Arzoumanidis et al. | |
| 4,547,476 A | 10/1985 | Terano et al. | |
| 4,816,433 A | 3/1989 | Terano et al. | |
| 4,829,037 A | 5/1989 | Terano et al. | |
| 4,927,797 A | 5/1990 | Ewen | |
| 4,990,479 A | 2/1991 | Ishimaru et al. | |
| 5,028,671 A | 7/1991 | Kioka et al. | |
| 5,034,361 A | 7/1991 | Job et al. | |
| 5,066,737 A | 11/1991 | Job | |
| 5,066,738 A | 11/1991 | Ewen | |
| 5,077,357 A | 12/1991 | Job | |
| 5,082,907 A | 1/1992 | Job | |
| 5,106,806 A | 4/1992 | Job | |
| 5,146,028 A | 9/1992 | Job | |
| 5,151,399 A | 9/1992 | Job | |
| 5,153,158 A | 10/1992 | Kioka et al. | |
| 5,229,342 A | 7/1993 | Job | |
| 5,247,031 A | 9/1993 | Kioka et al. | |
| 5,247,032 A | 9/1993 | Kioka et al. | |
| 5,539,309 A | 7/1996 | Van Wyk et al. | |
| 6,825,146 B2 | 11/2004 | Kilty et al. | |
| 2003/0069127 A1* | 4/2003 | Takaoki et al. | 502/108 |
| 2005/0096389 A1 | 5/2005 | Gao et al. | |
| 2005/0159564 A1* | 7/2005 | Huovinen et al. | 526/64 |
| 2005/0239636 A1* | 10/2005 | Gao et al. | 502/103 |

FOREIGN PATENT DOCUMENTS

| | | |
|---|---|---|
| CN | 1169845 C | 10/2004 |
| CN | 1580034 A | 2/2005 |
| EP | 0045977 B1 | 1/1987 |
| EP | 1042372 A1 | 10/2000 |
| EP | 1746110 A1 | 1/2007 |
| WO | 03/068828 A1 | 8/2003 |

* cited by examiner

*Primary Examiner* — Ling Choi
*Assistant Examiner* — Sonya Wright
(74) *Attorney, Agent, or Firm* — Whyte Hirschboeck Dudek SC

(57) ABSTRACT

Provided is a procatalyst composition containing a multiple internal electron donor with at least two components, one of which is a silyl ester. The other component of the mixed internal electron donor may be an electron donor component. The electron donor component may be an aromatic acid ester, a di-ether, and combinations thereof. Catalyst compositions containing the multiple internal electron donor exhibit improved hydrogen response during olefin polymerization and produce propylene-based polymers with broad molecular weight distribution, high flexural modulus, and high melt flow rate.

12 Claims, 1 Drawing Sheet

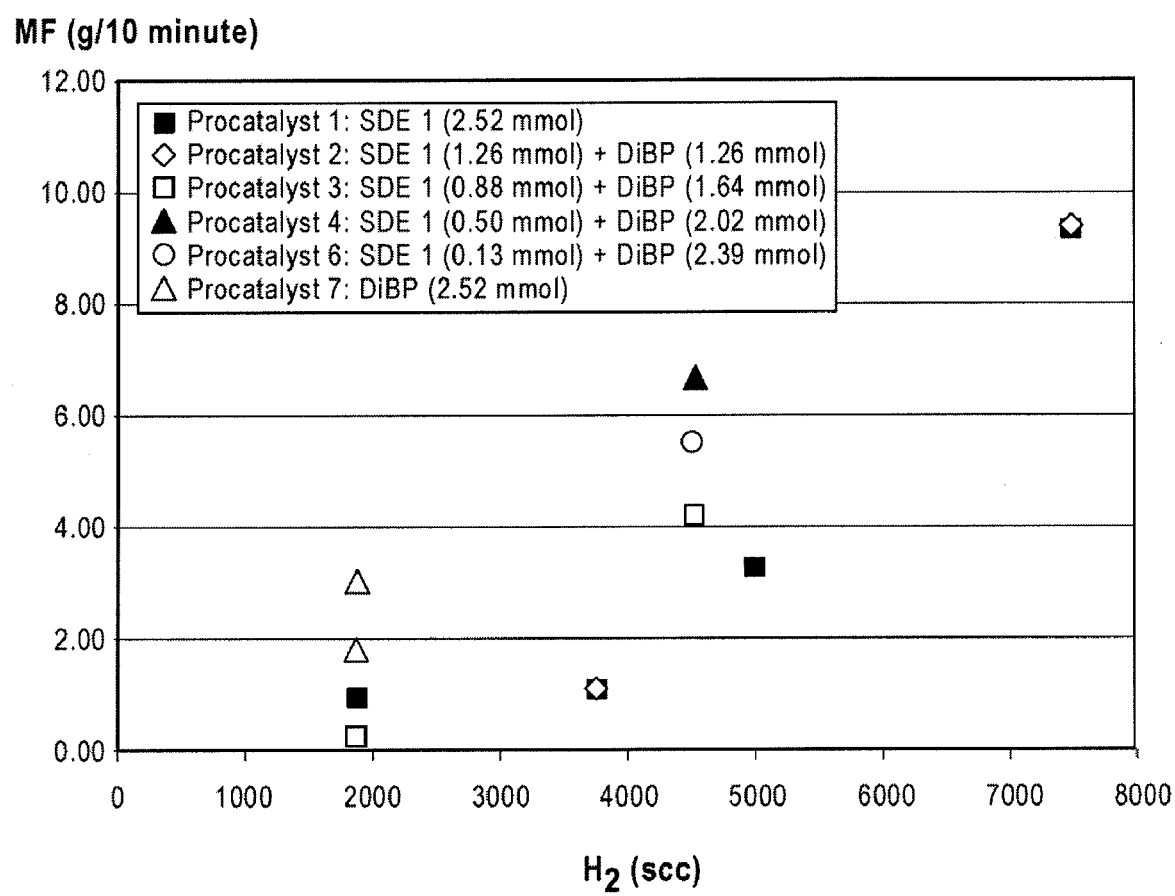

PROCATALYST COMPOSITION WITH MULTIPLE INTERNAL DONOR HAVING SILYL ESTER AND METHOD

CROSS REFERENCE TO RELATED APPLICATIONS

The present application claims priority to U.S. patent application Ser. No. 61/117,763, filed on Nov. 25, 2008, the entire content of which is incorporated by reference herein.

BACKGROUND

The present disclosure relates to procatalyst compositions having a multiple internal electron donor which includes silyl ester and the incorporation of the same in catalyst compositions and the process of making olefin-based polymers using said catalyst compositions.

Worldwide demand for olefin-based polymers continues to grow as applications for these polymers become more diverse and more sophisticated. Known are Ziegler-Natta catalyst compositions for the production of olefin-based polymers. Ziegler-Natta catalyst compositions typically include a procatalyst containing a transition metal halide (i.e., titanium, chromium, vanadium), a cocatalyst such as an organoaluminum compound, and optionally an external electron donor and/or an activity limiting agent. Ziegler-Natta catalyzed olefin-based polymers typically exhibit a narrow range of molecular weight distribution and low flexural modulus. Given the perennial emergence of new applications for olefin-based polymers, the art recognizes the need for olefin-based polymers with improved and varied properties. Desirable would be Ziegler-Natta catalyst compositions for the production olefin-based polymers that exhibit high hydrogen response during polymerization and produce propylene-based polymers with broad molecular weight distribution.

SUMMARY

The present disclosure is directed to procatalyst compositions with mixed internal electron donors that include silyl ester and the application of the same in catalyst compositions and polymerization processes. The catalyst compositions with mixed internal electron donors of the present disclosure demonstrate high catalyst activity and improved hydrogen response during polymerization. In addition, the present catalyst compositions with mixed internal electron donors produce propylene-based olefins with improved polymer properties such as high melt flow rate, broad molecular weight distribution, and/or high flexural modulus.

In an embodiment, a process for producing a procatalyst composition is provided. The process includes reacting a silyl ester, an electron donor component, a procatalyst precursor, and a halogenating agent. The reaction occurs in a reaction mixture. The process includes forming a procatalyst composition composed of a magnesium moiety, a titanium moiety, and a multiple internal electron donor. The multiple internal electron donor includes the silyl ester and the electron donor component. The electron donor component may be an aromatic acid ester, a di-ether, and combinations thereof.

The order and manner in which the components may be contacted and/or reacted can vary. In one embodiment, the process includes contacting the procatalyst precursor with the halogenating agent before addition of silyl ester and/or the electron donor component to the reaction mixture. In another embodiment, the process includes adding the silyl ester and the electron donor component to the reaction mixture simultaneously, or substantially simultaneously. In another embodiment, the process includes mixing the silyl ester and the electron donor component together to form a premix before addition to the reaction mixture. In still another embodiment, the process includes adding the electron donor component to the reaction mixture before adding the silyl ester to the reaction mixture. In yet another embodiment, the process includes adding the silyl ester to the reaction mixture before adding the electron donor component to the reaction mixture. The electron donor component and the silyl ester can be added at a molar ratio from about 0.1:1 to about 100:1.

In an embodiment, the process includes halogenating a procatalyst precursor in the presence of the electron donor component and then introducing the silyl ester in the subsequent halogenating process.

In an embodiment, the process includes removing the procatalyst composition from the reaction mixture. The procatalyst composition is subsequently contacted with a second amount the halogenating agent, the silyl ester, and/or the electron donor component.

In an embodiment, the process includes removing the procatalyst composition from the reaction mixture. The procatalyst composition may then be contacted with the same or different electron donor component, the same or different silyl ester, and/or the same or different halogenating agent.

In an embodiment, the electron donor component is an aromatic acid ester. The aromatic acid ester can be a phthalic acid ester or a benzoic acid ester. The phthalic acid ester or the benzoic acid ester may be added along with a silyl diol ester to a procatalyst precursor to form the procatalyst composition. The procatalyst precursor can be a benzoate-containing magnesium chloride procatalyst precursor, a mixed magnesium/titanium procatalyst precursor, or a magnesium moiety procatalyst precursor.

In an embodiment, the electron donor component is a di-ether.

In an embodiment, a procatalyst composition is provided. The procatalyst composition includes a combination of a magnesium moiety, a titanium moiety, and a multiple internal electron donor comprising a silyl ester. The multiple internal electron donor is composed of a silyl ester and an electron donor component. The electron donor component is an aromatic acid ester, a diether, and combinations thereof. The aromatic acid ester can be a benzoic acid ester, a phthalic acid ester, and combinations thereof.

The silyl ester has the structure (I) below.

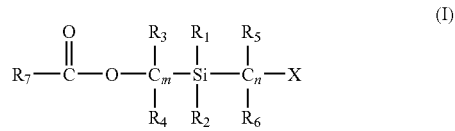

The terms m and n are each an integer from 1 to 5, each term denoting a hydrocarbyl with the same number of carbon atoms. $R_1$-$R_7$ are the same or different and are selected from hydrogen, a substituted hydrocarbyl group having 1 to 20 carbon atoms, an unsubstituted hydrocarbyl group having 1 to 20 carbon atoms, and combinations thereof. X is an electron donating group containing O, S, N, and/or P atom(s). In an embodiment, the silyl ester is a silyl diol ester.

In an embodiment, a catalyst composition is provided. The catalyst composition includes the multiple internal electron donor and a cocatalyst. The catalyst composition may optionally include an external electron donor and/or an activity limiting agent. The multiple internal electron donor includes a silyl ester and an electron donor component.

A process for producing an olefin-based polymer is provided in another embodiment of the present disclosure. The process includes contacting, under polymerization conditions, an olefin with a catalyst composition. The catalyst composition includes a multiple internal electron donor. The multiple internal electron donor comprises the silyl ester and the electron donor component. The process includes forming an olefin-based polymer. In an embodiment, the olefin is propylene.

An advantage of the present disclosure is the provision of an improved procatalyst composition.

An advantage of the present disclosure is the provision of an improved catalyst composition for the polymerization of olefin-based polymers.

An advantage of the present disclosure is a catalyst composition that contains a multiple internal electron donor containing a silyl ester, the catalyst composition exhibiting improved hydrogen response during polymerization.

An advantage of the present disclosure is a catalyst composition that produces a propylene-based polymer with a high melt flow rate.

An advantage of the present disclosure is a catalyst composition containing a silyl ester internal electron donor that produces a propylene-based polymer with broad molecular weight distribution.

An advantage of the present disclosure is a catalyst composition that produces a propylene-based polymer with high flexural modulus.

An advantage of the present disclosure is a catalyst composition that contains a multiple internal electron donor containing a silyl ester, the catalyst composition having improved hydrogen response, the catalyst composition producing a propylene-based polymer with a high melt flow rate, and/or broad molecular weight distribution, and/or high flexural modulus.

BRIEF DESCRIPTION OF THE DRAWINGS

FIG. 1 is a graph showing hydrogen response and polymer melt flow rate for catalyst compositions and olefin-based polymers formed therefrom in accordance with an embodiment of the present disclosure.

DETAILED DESCRIPTION

In an embodiment, a process for producing a procatalyst composition is provided. The process includes reacting a silyl ester, an electron donor component, a procatalyst precursor, and a halogenating agent. The reaction occurs in a reaction mixture. The reaction results in the formation of a procatalyst composition. The procatalyst composition includes a magnesium moiety, a titanium moiety, and a multiple internal electron donor. The multiple internal electron donor includes the silyl ester and the electron donor component.

As used herein, an "internal electron donor" is a compound added during formation of the procatalyst composition that donates a pair of electrons to one or more metals present in the resultant procatalyst composition. Not bounded by any particular theory, it is believed that the internal electron donor assists in regulating the formation of active sites, thereby enhancing catalyst stereoselectivity. As used herein, a "multiple internal electron donor" is (i) a silyl ester, (ii) an electron donor component, and (iii) optionally one or more another components. As used herein, an "electron donor component" is a component that donates a pair of electrons to one or more metals present in the resultant procatalyst composition. In this sense, each of the silyl ester and the electron donor component is each an internal electron donor. In an embodiment, the internal electron component is an aromatic acid ester, a diether, and combinations thereof.

In an embodiment, the silyl ester has the structure (I) below.

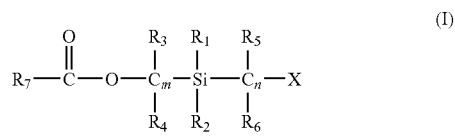

(I)

The letters "m" and "n" are each an integer from 1 to 5, m and n being the same or different, m and n each denoting the number of carbon atoms in the respective carbon chain. It is understood that each additional carbon in the $C_m$ carbon chain and/or in the $C_n$ carbon chain can include one or more R' substituent(s). The R' substituent(s) can be hydrogen or a substituted/unsubstituted hydrocarbyl group having 1 to 20 carbon atoms.

The substituents $R_1$, $R_2$, $R_3$, $R_4$, $R_5$, $R_6$ and $R_7$ can be the same or different. $R_1$-$R_7$ are selected from hydrogen, a substituted hydrocarbyl group having 1 to 20 carbon atoms, an unsubstituted hydrocarbyl group having 1 to 20 carbon atoms, and combinations thereof. As used herein, the term "hydrocarbyl" and "hydrocarbon" refer to substituents containing only hydrogen and carbon atoms, including branched or unbranched, saturated or unsaturated, cyclic, polycyclic or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl- groups.

As used herein, each term "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" is an atom other than carbon or hydrogen. The heteroatom can be a non-carbon atom from Groups IV, V, VI, and VII of the Periodic Table. Nonlimiting examples of heteroatoms include: F, Cl, Br, N, O, P, B, S, and Si. As used herein, the term "halohydrocarbyl" is a hydrocarbyl that is substituted with one or more halogen atoms.

The symbol "X" of structure (I) represents an electron donating group. The term "electron donating group" refers to a functional group that is capable of donating one or more electron pairs to metal atom(s). Nonlimiting examples of suitable electron donating groups include —C(═O)OR, —O(O═)CR, —(O═)CNHR, —(O═)CNRR', —NH(O═)CR, —NR'(O═)CR, —C(═O)R, —OR, —NHR, —NR'R, —SR, —OP(OR')(OR), —S(═O)R, —S(═O)$_2$R, —OS(═O)$_2$(OR), and combinations thereof.

R and R' of the electron donating group X can be a substituted or an unsubstituted hydrocarbyl group having 1 to 20 carbon atoms.

The structures for each of the foregoing electron donating groups are provided in Table 1 below.

TABLE 1

| Abbreviation | Structure |
| --- | --- |
| —C(=O)OR | —C(=O)—OR |
| —O(O=)CR | —O—C(=O)—R |
| —(O=)CNHR | —C(=O)—N(H)—R |
| —O(O=)CNRR' | —C(=O)—N(R)(R') |
| —NH(O=)CR | —N(H)—C(=O)—R |
| —NR'(O=)CR | —NR'—C(=O)—R |
| —C(=O)R | —C(=O)—R |
| —OR | —O—R |
| —NHR | —N(H)—R |
| —NR'R | —N(R')(R) |
| —SR | —S—R |
| —OP(OR')(OR) | —O—P(OR')(OR) |
| —S(=O)R | —S(=O)—R |
| —S(=O)$_2$R | —S(=O)$_2$—R |
| —OS(=O)$_2$(OR) | —O—S(=O)$_2$—OR |

In an embodiment, the silyl ester includes $R_7$ that is a benzene-ring-containing group. As used herein, a "benzene-ring-containing group" is a component that includes one or more benzene rings. Nonlimiting examples of suitable benzene-ring-containing groups include single benzene groups such as phenyl groups, and multiple and/or fused benzene groups such as naphthyl groups. The benzene-ring-containing group may optionally be substituted with one or more of the following: $C_{1-20}$ alkyl group(s), $C_{1-20}$ alkoxy group(s), $C_{1-20}$ alkoxycarbonyl group(s), halogen atom(s), and any combination thereof.

In an embodiment, the silyl ester includes $R_7$ that is a phenyl group. $R_1$ and $R_2$ are the same or different, $R_1$ and $R_2$ and are each selected from hydrogen, a $C_{1-6}$ alkyl group, and combinations thereof. Nonlimiting examples of $C_1$-$C_6$ alkyl groups include methyl, ethyl, n-propyl, isopropyl, isobutyl, n-butyl, t-butyl, n-pentyl, and n-hexyl groups.

In an embodiment, the silyl ester includes $R_7$ that is a phenyl group, $R_3$-$R_6$ are hydrogen, and $R_1$ and $R_2$ are the same or different and each is selected from hydrogen, a $C_{1-6}$ alkyl group, and combinations thereof.

In an embodiment, the silyl ester is a silyl diol ester. The silyl diol ester has the structure (II):

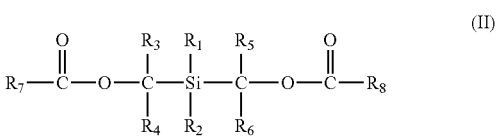

(II)

wherein $R_1$-$R_8$ are the same or different. Each of $R_1$-$R_8$ is selected from hydrogen, a substituted hydrocarbyl group having 1 to 20 carbon atoms, an unsubstituted hydrocarbyl group having 1 to 20 carbon atoms, and combinations thereof.

In an embodiment, $R_7$ and $R_8$ can be the same or different. Each of $R_7$ and $R_8$ is selected from a benzene-ring-containing group. The benzene-ring-containing group may optionally be substituted with one or more of the following: $C_{1-20}$ alkyl group(s), $C_{1-20}$ alkoxy group(s), $C_{1-20}$ alkoxycarbonyl group(s), halogen atom(s), and any combination thereof.

In an embodiment, $R_1$ and $R_2$ can be the same or different. $R_1$ and $R_2$ are each selected from hydrogen, a $C_1$-$C_6$ alkyl group, and combinations thereof.

In an embodiment, $R_7$ and $R_8$ are each a phenyl group. $R_1$-$R_6$ are the same or different and each is selected from hydrogen, a $C_1$-$C_6$ alkyl group, and combinations thereof.

In an embodiment, the silyl diol ester has the structure (III) below:

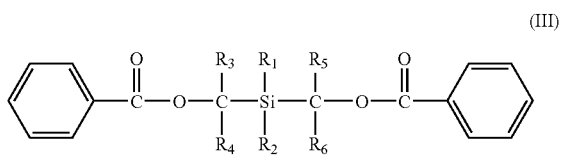

(III)

wherein $R_1$-$R_6$ are the same or different and each is selected from hydrogen, a $C_1$-$C_6$ alkyl group, and combinations thereof.

In an embodiment, the silyl diol ester of structure (III) includes $R_1$ and $R_2$ which are the same or different and each is selected from hydrogen, or a $C_1$-$C_6$ alkyl group. Each of $R_3$-$R_6$ is hydrogen.

In an embodiment, the silyl diol ester of structure (III) includes $R_1$ and $R_2$ that are the same or different. Each of $R_1$ and $R_2$ is selected from hydrogen, methyl, ethyl, n-propyl, i-propyl, n-butyl, i-butyl, t-butyl, and combinations thereof. Each of $R_3$-$R_6$ is hydrogen.

In an embodiment, the silyl diol ester of structure (III) includes $R_1$ and $R_2$ that are the same or different. Each of $R_1$ and $R_2$ is selected from hydrogen, methyl, ethyl, n-propyl, i-propyl, n-butyl, i-butyl, t-butyl, and combinations thereof. Each of $R_3$-$R_6$ is methyl.

In an embodiment, the silyl diol ester of structure (III) includes $R_1$ and $R_2$ that are the same or different. Each of $R_1$ and $R_2$ is selected from hydrogen, methyl, ethyl, n-propyl, i-propyl, n-butyl, i-butyl, t-butyl, and combinations thereof. Each of $R_3$ and $R_5$ is methyl. Each of $R_4$ and $R_6$ is hydrogen.

Nonlimiting examples of the silyl diol ester are set forth in Table 2 below.

TABLE 2

| Name | Structure |
|---|---|
| Bis(benzoyloxy)dimethylsilane | |
| Bis(benzoyloxy)diethylsilane | |
| Bis(benzoyloxy)ethylmethylsilane | |
| Bis(benzoyloxy)isobutylmethylsilane | |

The process also includes adding an electron donor component to the reaction mixture. In an embodiment, the electron donor component may be an aromatic acid ester, a diether, and combinations thereof.

In an embodiment, the electron donor component is an aromatic acid ester. As used herein, an "aromatic acid ester" is a monocarboxylic acid ester or a polycarboxylic acid ester that includes structure (IV) as follows:

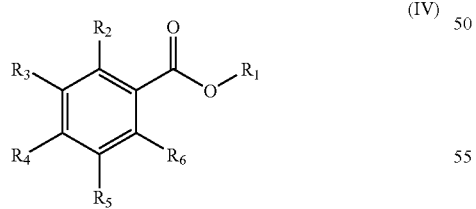

wherein $R_1$ is selected from a hydrocarbyl having 1 to 10 carbon atoms, a substituted hydrocarbyl having 1 to 10 carbon atoms, and a heteroatom-containing group.

In an embodiment, the hydrocarbyl group of $R_1$ can include a substituted- or unsubstituted-hydrocarbyl group having 1 to 10 carbon atoms.

$R_2$-$R_6$ of the aromatic acid ester of structure (IV) are the same or different, each being selected from hydrogen, a hydrocarbyl having 1 to 10 carbon atoms, a substituted hydrocarbyl having 1 to 10 atoms, an alkoxycarbonyl having 1 to 10 carbon atoms, an alkoxy group having 1 to 10 carbon atoms, a heteroatom, and combinations thereof.

In an embodiment, the aromatic acid ester is a benzoic acid ester. As used herein, "benzoic acid ester" is a monocarboxylic acid ester with the structure (V) below:

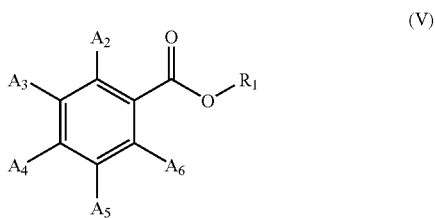

wherein $R_1$ is the same as $R_1$ of structure (IV). $A_2$-$A_6$ are the same or different and each is selected from hydrogen, a hydrocarbyl having 1 to 10 carbon atoms, a substituted hydrocarbyl having 1 to 10 atoms, an alkoxy group having 1 to 10 carbon atoms, a heteroatom, and combinations thereof. Nonlimiting examples of suitable benzoic acid esters include an alkyl p-alkoxybenzoate (such as ethyl p-methoxybenzoate, methyl p-ethoxybenzoate, ethyl p-ethoxybenzoate), an alkyl benzoate (such as ethyl benzoate, methyl benzoate), an alkyl p-halobenzoate (ethyl p-chlorobenzoate, ethyl p-bromobenzoate), a benzoyl halide (such as benzoyl chloride), and benzoic anhydride. In an embodiment, the benzoic acid ester is selected from ethyl benzoate, benzoyl chloride, ethyl p-bromobenzoate, n-propyl benzoate, and benzoic anhydride. In another embodiment, the benzoic acid ester is ethyl benzoate.

In an embodiment, the aromatic acid ester is a phthalic acid ester. As used herein, a "phthalic acid ester" refers to a polycarboxylic acid ester with the structure (VI) below:

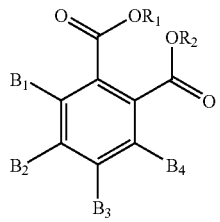

(VI)

wherein $R_1$ and $R_2$ are the same or different and each is selected from a hydrocarbyl having 1 to 10 carbon atoms and a substituted hydrocarbyl having 1 to 10 carbon atoms. $B_1$-$B_4$ are the same or different and each is selected from hydrogen, a hydrocarbyl having 1 to 10 carbon atoms, a substituted hydrocarbyl having 1 to 10 atoms, an alkoxy group having 1 to 10 carbon atoms, a heteroatom, and combinations thereof. Nonlimiting examples of suitable phthalic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, bis(2,2,2-trifluoroethyl) phthalate, diisobutyl 4-t-butylphthalate, and diisobutyl 4-chlorophthalate. In an embodiment, the phthalic acid ester is diisobutyl phthalate.

In an embodiment, the aromatic acid ester includes acyl halides or anhydrides. Not wishing to be bound by any particular theory, it is believed that the acyl halides and/or anhydrides react with the ethoxide species in the procatalyst precursor to form the corresponding ethyl esters. In an embodiment, benzoyl chloride is used alone or in combination with ethyl benzoate. In another embodiment, phthaloyl chloride and/or phthalic anhydride is used to replace phthalate.

In an embodiment, the electron donor component is a di-ether. The di-ether may be a dialkyl di-ether compound represented by the structure (VII):

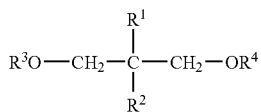

(VII)

wherein $R^1$ to $R^4$ are independently of one another an alkyl, aryl or aralkyl group having up to 20 carbon atoms, which may optionally contain a group 14, 15, 16, or 17 heteroatom, provided that $R^1$ and $R^2$ may be a hydrogen atom. $R_1$ and $R_2$ may also be linked to form a cyclic structure, such as cyclopentadiene or fluorene. The dialkylether may be linear or branched, and may include one or more or more of the following groups: alkyl, cycloaliphatic, aryl, alkylaryl or aralkyl radicals with 1-18 carbon atoms, and hydrogen. Nonlimiting examples of suitable dialkyl diether compounds include dimethyl diether, diethyl diether, dibutyl diether, methyl ethyl diether, methyl butyl diether, methyl cyclohexyl diether, 2,2-dimethyl-1,3-dimethoxypropane, 2,2-diethyl-1,3-dimethoxypropane, 2,2-di-n-butyl-1,3-dimethoxypropane, 2,2-diisobutyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane, 2-n-propyl-2-cyclohexyl-1,3-diethoxypropane, 2-(2-ethylhexyl)-1,3-dimethoxypropane, 2-isopropyl-1,3-dimethoxypropane, 2-n-butyl-1,3-dimethoxypropane, 2-sec-butyl-1,3-dimethoxypropane, 2-cyclohexyl-1,3-dimethoxypropane, 2-phenyl-1,3-diethoxypropane, 2-cumyl-1,3-diethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-di-n-propyl-1,3-dimethoxypropane, 2-methyl-2-n-propyl-1,3-dimethoxypropane, 2-methyl-2-benzyl-1,3-dimethoxypropane, 2-methyl-2-ethyl-1,3-dimethoxypropane, 2-methyl-2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxy propane, 2-methyl-2-isopropyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-di-n-butoxypropane, 2,2-di-sec-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 2-isopropyl-2-(3,7-dimethyloctyl)-1,3-dimethoxypropane, 2,2-diisopropyl-1,3-dimethoxypropane, 2-isopropyl-2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-n-heptyl-2-n-pentyl-1,3-dimethoxypropane, 9,9-bis(methoxymethyl)fluorene, 1,3-dicyclohexyl-2,2-bis(methoxymethyl)propane, and 3,3-bis(methoxymethyl)-2,5-dimethylhexane, or any combination of the foregoing. In an embodiment, the electron donor component is selected from 1,3-dicyclohexyl-2,2-bis(methoxymethyl)propane, 3,3-bis(methoxymethyl)-2,5-dimethylhexane, 2,2-dicyclopentyl-1,3-dimethoxypropane, and combinations thereof.

The reaction mixture includes a procatalyst precursor and a halogenating agent. The procatalyst precursor can include (i) magnesium; (ii) a transition metal compound of an element from Periodic Table groups IV to VIII; (iii) a halide, an oxyhalide, and/or an alkoxide of (i) and/or (ii); and (iv) combinations of (i), (ii), and (iii). Nonlimiting examples of suitable procatalyst precursors include halides, oxyhalides, and alkoxides of magnesium, titanium, manganese, vanadium, chromium, molybdenum, zirconium, hafnium, and combinations thereof.

Various methods of making procatalyst precursors are known in the art. These methods are described, inter alia, in U.S. Pat. Nos. 6,825,146; 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, and elsewhere. In an embodiment, the preparation of the procatalyst precursor involves halogenation of mixed magnesium and titanium alkoxides, and may involve the use of one or more compounds, referred to as "clipping agents", that aid in forming specific, low molecular weight, compositions of the desired morphology. Nonlimiting examples of suitable clipping agents include trialkylborates, especially triethylborate, phenolic compounds, especially cresol, and silanes.

In an embodiment, the procatalyst precursor is a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carboxylated magnesium dialkoxide or aryloxide. In one embodiment, the MagMo precursor is a magnesium di-$(C_{1-4})$alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_d Ti(OR^e)_f X_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The precursors are prepared by controlled precipitation through removal of an alcohol from the reaction mixture used in their preparation. In an embodiment, a reaction medium comprises a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having especially desirable morphology and surface area. Moreover, the resulting precursors are particularly uniform in particle size.

In an embodiment, the procatalyst precursor is a benzoate-containing magnesium chloride material ("BenMag"). As used herein, a "benzoate-containing magnesium chloride" ("BenMag") can be a procatalyst (i.e., a halogenated procatalyst precursor) containing a benzoate internal electron donor. The BenMag material may also include a titanium moiety, such as a titanium halide. The benzoate internal electron donor is labile and can be replaced by other electron donors during procatalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. Not wishing to be bound by any particular theory, surprisingly and unexpectedly it has been found that the BenMag procatalyst precursor inhibits or otherwise prevents the silyl ester of the present procatalyst composition(s) from decomposing during preparation of the solid procatalyst composition. Nonlimiting examples of suitable BenMag procatalyst precursors include catalysts of the trade names SHAC™ 103 and SHAC™ 310 available from The Dow Chemical Company, Midland, Mich.

In an embodiment, the procatalyst precursor is converted to a solid procatalyst by way of halogenation. Halogenation includes contacting the procatalyst precursor with a halogenating agent in the presence of internal electron donors such as the silyl ester and/or the electron donor component. These components form a reaction mixture. Halogenation converts the magnesium moiety present in the procatalyst precursor into a magnesium halide support upon which the titanium moiety (such as a titanium halide) is deposited. Not wishing to be bound by any particular theory, it is believed that during halogenation the internal electron donor(s) (1) regulates the position of titanium on the magnesium-based support, (2) facilitates conversion of the magnesium and titanium moieties into respective halides and (3) regulates the crystallite size of the magnesium halide support during conversion. Thus, provision of the internal electron donors yields a procatalyst composition with stereoselectivity.

In an embodiment, the halogenating agent is a titanium halide having the formula $Ti(OR^e)_f X_h$ wherein $R^e$ and X are defined as above, f is an integer from 0 to 3; h is an integer from 1 to 4; and f+h is 4. In an embodiment, the halogenation agent is $TiCl_4$. In a further embodiment, the halogenation is conducted in a reaction mixture that includes a chlorinated or a non-chlorinated aromatic liquid, such as dichlorobenzene, o-chlorotoluene, chlorobenzene, benzene, toluene, or xylene. In yet another embodiment, the halogenation is conducted by use of a mixture of halogenating agent and chlorinated aromatic liquid comprising from 40 to 60 volume percent halogenating agent, such as $TiCl_4$.

In an embodiment, the reaction mixture is heated during halogenation. The procatalyst precursor and the halogenating agent are contacted initially at a temperature from 0° C. to 60° C., or from 20° C. to 30° C., and heating is commenced at a rate of 0.1 to 10.0° C./minute, or at a rate of 1.0 to 5.0° C./minute. The internal electron donor(s) may be added later, after an initial contact period between the halogenating agent and procatalyst precursor. Temperatures for the halogenation are from 60° C. to 150° C. (or any value or subrange therebetween), or from 90° C. to 120° C. Halogenation may be continued in the substantial absence of the internal electron donors for a period from 5 to 60 minutes, or from 10 to 50 minutes.

The manner in which the procatalyst precursor, the halogenating agent and the internal electron donor(s) are contacted may be varied. In an embodiment, the procatalyst precursor is first contacted with a mixture containing the halogenating agent and a chlorinated aromatic compound. The resulting mixture is stirred and may be heated if desired. Next, the internal electron donor(s) is/are added to the same reaction mixture without isolating or recovering of the precursor. The foregoing process may be conducted in a single reactor with addition of the various ingredients controlled by automated process control.

Contact times of the procatalyst precursor with the internal electron donor(s) are at least 10 minutes, or at least 15 minutes, or at least 20 minutes, or at least 1 hour at a temperature from at least 25° C., or at least 50° C., or at least 60° C. up to a temperature of 150° C., or up to 120° C., or up to 115° C., or up to 110° C.

The halogenation procedure may be repeated one, two, three, or more times as desired. In an embodiment, the process includes removing the procatalyst composition from the reaction mixture and contacting the procatalyst composition with a second amount of the halogenating agent, the electron donor component, the silyl ester, and any combination thereof. In another embodiment, the resulting solid material is recovered from the reaction mixture and contacted one or more times in the absence (or in the presence) of the same (or different) internal electron donor(s) components with a mixture of the halogenating agent in the chlorinated aromatic compound for at least about 10 minutes, or at least about 15 minutes, or at least about 20 minutes, and up to about 1 hour, or up to about 45 minutes, or up to about 30 minutes, at a temperature from at least about 25° C., or at least about 50° C., or at least about 60° C., to a temperature up to about 150° C., or up to about 120° C., or up to about 115° C.

After the foregoing halogenation procedure, the resulting solid procatalyst composition is separated from the reaction mixture employed in the final process, by filtering for example, to produce a moist filter cake. The moist filter cake may then be rinsed or washed with a liquid diluent to remove unreacted TiCl$_4$ and may be dried to remove residual liquid, if desired. Typically the resultant solid procatalyst composition is washed one or more times with a "wash liquid," which is a liquid hydrocarbon such as an aliphatic hydrocarbon such as isopentane, isooctane, isohexane, hexane, pentane, or octane. The solid procatalyst composition then can be separated and dried or slurried in a hydrocarbon, especially a relatively heavy hydrocarbon such as mineral oil for further storage or use.

In an embodiment, the process includes removing, or otherwise recovering, the procatalyst composition from the reaction mixture. The procatalyst composition is then contacted with a second halogenating agent and one or both of a second silyl diol ester and a second electron donor component. The second halogenating agent, second silyl diol ester, and second electron donor component may be the same or different than the respective initial halogenating agent, initial silyl diol ester, and initial electron donor component. The second halogenating agent, the second silyl ester and the second electron donor component may be the same or different than the each respective initial component.

The internal electron donor(s) may be added in the same halogenation step or in different steps. Any internal electron donor can be added in more than one halogenation step. In an embodiment, ethyl benzoate is added in the 1$^{st}$ and 2$^{nd}$ halogenation steps and a silyl diol ester is added during the 3$^{rd}$ halogenation step. In another embodiment, ethyl benzoate is added in 1$^{st}$ halogenation step, benzoyl chloride is added in the 2$^{nd}$ halogenation step, and a silyl diol ester is added in the last halogenation step. In another embodiment, diisobutyl phthalate is used in the 1$^{st}$ halogenation step and a silyl diol ester is added in the 2$^{nd}$ halogenation step.

In an embodiment, the resulting solid procatalyst composition has a titanium content of from about 0.1 percent by weight to about 6.0 percent by weight, based on the total solids weight, or from about 1.0 percent by weight to about 4.5 percent by weight, or from about 1.5 percent by weight to about 3.5 percent by weight. In an embodiment, the multiple internal electron donor may be present in the procatalyst composition in a molar ratio of multiple internal electron donor to magnesium of from about 0.01:1 to about 0.5:1, or from about 0.03:1 to about 0.2:1. Weight percent is based on the total weight of the procatalyst composition.

In an embodiment, the procatalyst composition may be further treated by one or more of the following procedures prior to or after isolation of the solid procatalyst composition. The solid procatalyst composition may be contacted (halogenated) with a further quantity of titanium halide compound, if desired; it may be exchanged under metathesis conditions with an acid chloride, such as phthaloyl dichloride or benzoyl chloride; and it may be rinsed or washed, heat treated; or aged. The foregoing additional procedures may be combined in any order or employed separately, or not at all.

Not wishing to be bound by any particular theory, it is believed that (1) further halogenation by contacting the previously formed procatalyst composition with a titanium halide compound, especially a solution thereof in a halohydrocarbon diluent, and/or (2) further washing the previously formed procatalyst composition with a halohydrocarbon or hydrocarbon at an elevated temperature (100-150° C.), results in desirable modification of the procatalyst composition, possibly by removal of certain inactive metal compounds that are soluble in the foregoing diluent. Accordingly, in an embodiment, the procatalyst is contacted with a halogenating agent, such as a mixture of a titanium halide and a halohydrocarbon diluent, such as TiCl$_4$ and chlorobenzene, one or more times prior to isolation or recovery. In another embodiment, the procatalyst is washed at a temperature between 100 to 150° C. with chlorobenzene or o-chlorotoluene one or more times prior to isolation or recovery.

In an embodiment, a procatalyst composition is provided which includes a combination of a magnesium moiety, a titanium moiety and a multiple internal electron donor. The multiple internal electron donor includes a silyl ester and an electron donor component. The procatalyst composition is produced by way of the foregoing halogenation procedure which converts the procatalyst precursor and the silyl ester/electron donor component into a combination of the magnesium and titanium moieties, into which the internal electron donors are incorporated. The procatalyst precursor from which the procatalyst composition is formed can be the magnesium moiety precursor, the mixed magnesium/titanium precursor, or the benzoate-containing magnesium chloride precursor.

The multiple internal electron donor includes a silyl ester, the electron donor component, and at least one other component as previously disclosed. The silyl ester can be any silyl ester as disclosed herein. The multiple electron donor component includes from about 0.1 mol % to about 99.9 mol % silyl ester and from about 99.9 mol % to about 0.1 mol %.

In an embodiment, the electron donor component is an aromatic acid ester, a diether, or combinations thereof.

In an embodiment, the magnesium moiety is a magnesium halide. In another embodiment, the magnesium halide is magnesium chloride, or magnesium chloride alcohol adduct.

In an embodiment, the titanium moiety is a titanium chloride. In another embodiment the titanium halide is titanium tetrachloride.

In an embodiment, the procatalyst composition is a combination of a magnesium chloride, a titanium chloride and the multiple internal electron donor. In another embodiment, the procatalyst composition includes a magnesium chloride support upon which a titanium chloride is deposited and into which the multiple internal electron donor is incorporated.

In an embodiment, the multiple internal electron donor of the procatalyst composition comprises a silyl ester of the structure (I):

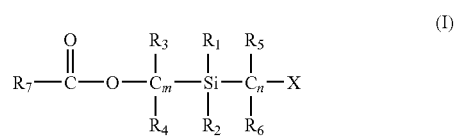

(I)

wherein $C_m$, $C_n$, $R_{1-7}$ and X can any substituent as previously disclosed for structure (I). The multiple internal electron donor of the procatalyst composition can include one or more embodiments of structure (I) as previously disclosed.

In an embodiment, the mixed internal electron donor includes a silyl diol ester of the structure (II):

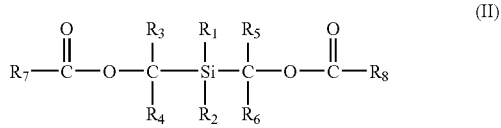

(II)

wherein $R_1$-$R_8$ are the same or different. Each of $R_1$-$R_8$ is selected from hydrogen, a substituted hydrocarbyl group having 1 to 20 carbon atoms, an unsubstituted hydrocarbyl group having 1 to 20 carbon atoms, and combinations thereof. The multiple internal electron donor of the procatalyst composition can include one or more embodiments of structure (II) as previously disclosed.

In an embodiment, the multiple internal electron donor includes a silyl diol ester of the structure (III):

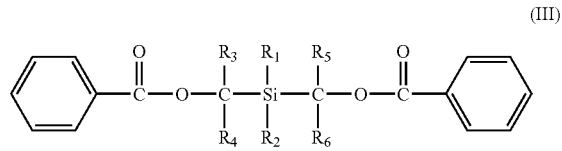

(III)

wherein $R_1$-$R_6$ are the same or different and each is selected from hydrogen, a $C_1$-$C_6$ alkyl group, and combinations thereof. The mixed internal electron donor of the procatalyst composition can include one or more embodiments of structure (III) as previously disclosed.

In an embodiment, the multiple internal electron donor includes an electron donor component that is an aromatic acid ester of the structure (IV):

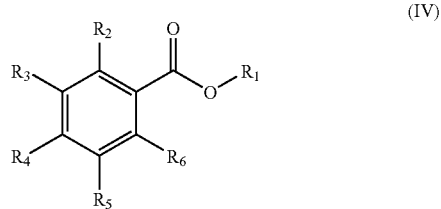

(IV)

wherein $R_1$ is selected from a hydrocarbyl having 1 to 10 carbon atoms, a substituted hydrocarbyl having 1 to 10 carbon atoms, and a heteroatom-containing group. $R_2$-$R_6$ of the aromatic acid ester can be any substituent as previously disclosed for structure (IV). The multiple internal electron donor of the procatalyst composition can include one or more embodiments of structure (IV) as previously disclosed.

In an embodiment, the multiple internal electron donor includes an electron donor component that is a benzoic acid ester of the structure (V):

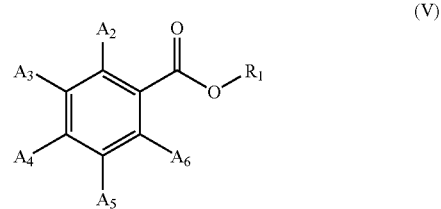

(V)

wherein $R_1$ is the same as $R_1$ of structure (IV). $A_2$-$A_6$ are the same or different and each is selected from hydrogen, a hydrocarbyl having 1 to 10 carbon atoms, a substituted hydrocarbyl having 1 to 10 atoms, an alkoxy group having 1 to 10 carbon atoms, a heteroatom, and combinations thereof. The multiple internal electron donor of the procatalyst composition can include one or more embodiments of structure (V) as previously disclosed.

In an embodiment, the multiple internal electron donor includes an electron donor component that is a phthalic acid ester of the structure (VI):

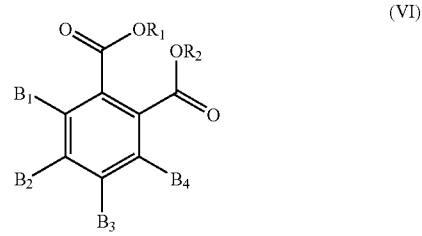

(VI)

wherein $R_1$ and $R_2$ are the same or different and each is selected from a hydrocarbonyl having 1 to 10 carbon atoms and a substituted hydrocarbonyl having 1 to 10 carbon atoms. $B_1$-$B_4$ are the same or different and each is selected from hydrogen, a hydrocarbyl having 1 to 10 carbon atoms, a substituted hydrocarbyl having 1 to 10 atoms, an alkoxy group having 1 to 10 carbon atoms, a heteroatom, and combinations thereof. The multiple internal electron donor of the procatalyst composition can include one or more embodiments of structure (VI) as previously disclosed.

In an embodiment, the multiple internal electron donor includes an electron donor component that is a di-ether of the structure (VII):

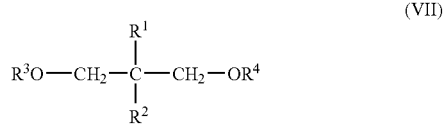

(VII)

wherein $R^1$ to $R^4$ are independently of one another an alkyl, aryl or aralkyl group having up to 20 carbon atoms, which may optionally contain a group 14, 15, 16, or 17 heteroatom, provided that $R^1$ and $R^2$ may be a hydrogen atom. $R_1$ and $R_2$ may also be linked to form a cyclic structure, such as cyclopentadiene or fluorene. The multiple internal electron donor of the procatalyst composition can include one or more embodiments of structure (VII) as previously disclosed.

In an embodiment, the multiple internal electron donor includes a silyl ester and an aromatic acid ester.

In an embodiment, the multiple internal electron donor includes a silyl diol ester and a benzoic acid ester.

In an embodiment, the multiple internal electron donor includes a silyl diol ester and a phthalic acid ester.

In an embodiment, the multiple internal electron donor includes a silyl diol ester and a di-ether. Nonlimiting examples of suitable diethers include 1,3 dicyclohexyl-2,2-bis(methoxymethyl)propane, 3-3-bis(methoxymethyl)-2,5-dimethylhexane, and combinations thereof.

Ethoxide content in the procatalyst composition indicates the completeness of conversion of precursor metal ethoxide into a metal halide. The present multiple internal electron donor assists in converting ethoxide into halide during halogenation. In an embodiment, the procatalyst composition includes from about 0.01 wt % to about 1.0 wt %, or from about 0.05 wt % to about 0.5 wt % ethoxide. Weight percent is based on the total weight of the procatalyst composition.

In an embodiment, the procatalyst composition includes from about 0.1 wt % to about 15.0 wt %, or from about 1.0 wt % to about 12.0 wt % ethyl benzoate. Not wishing to be bound by any particular theory, it is believed that the presence of a benzoate during procatalyst formation inhibits or otherwise reduces decomposition of the silyl ester. The origin of the ethyl benzoate can be from (i) the procatalyst precursor, (ii) a silyl ester, (iii) an electron donor component, (iv) addition of ethyl benzoate, benzoic anhydride, or benzoyl chloride during halogenation, and (iv) any combination of (i)-(iv).

In an embodiment, the procatalyst composition includes from about 0.1 wt % to about 20 wt %, or from about 1.0 wt % to about 16 wt % silyl ester. Weight percent is based on the total weight of the procatalyst composition.

In an embodiment, the procatalyst composition includes from about 0.1 wt % to about 6.0 wt %, or from about 1.0 wt % to about 5.0 wt % titanium. Weight percent is based on the total weight of the procatalyst composition.

In an embodiment, the magnesium to multiple internal electron donor molar ratio is from about 100:1 to about 1:1, or from about 30:1 to about 2:1, or from about 20:1 to about 3:1.

The procatalyst composition may comprise two or more embodiments disclosed herein.

In an embodiment, a catalyst composition is provided. As used herein, "a catalyst composition" is a composition that forms an olefin-based polymer when contacted with an olefin under polymerization conditions. The catalyst composition includes a procatalyst composition and a cocatalyst. The procatalyst composition can be any of the foregoing procatalyst compositions containing the multiple internal electron donor. The catalyst composition may optionally include an external electron donor and/or an activity limiting agent.

In an embodiment, the multiple internal electron donor includes (i) a silyl ester, and (ii) an aromatic ester, a di-ether, and combinations thereof.

The catalyst composition includes a cocatalyst. As used herein, a "cocatalyst" is a substance capable of converting the procatalyst composition to an active polymerization catalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, i-propyl, n-butyl, i-butyl, t-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl, phenyl, phenethyl, methoxyphenyl, benzyl, tolyl, xylyl, naphthyl, methylnapthyl, cyclohexyl, cycloheptyl, and cyclooctyl.

Nonlimiting examples of suitable hydrocarbyl aluminum compounds are as follows: triisobutylaluminum, trihexylaluminum, diisobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum, tribenzylaluminum, triphenylaluminum, trinaphthylaluminum, and tritolylaluminum. In an embodiment, the cocatalyst is selected from triethylaluminum, tri-isobutylaluminum, tri-n-hexylaluminum, di-isobutylaluminum hydride, and di-n-hexylaluminum hydride.

In an embodiment, the cocatalyst is a hydrocarbyl aluminum compound represented by the formula $R_nAlX_{3-n}$ wherein n=1 or 2, R is an alkyl, and X is a halide or alkoxide. Nonlimiting examples of suitable compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, and dimethylaluminum chloride.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1. In another embodiment, the molar ratio of aluminum to titanium is about 45:1.

In an embodiment, the catalyst composition includes an external electron donor. As used herein, an "external electron donor" is a compound added independent of procatalyst formation and contains at least one functional group that is capable of donating a pair of electrons to a metal atom. Bounded by no particular theory, it is believed that the external electron donor enhances catalyst stereoselectivity, (i.e., reduces xylene soluble material in the formant polymer).

In an embodiment, the external electron donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In an embodiment, the external electron donor is an alkoxysilane. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-20}$ alkyl group; and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, di-n-butyldimethoxysilane, isobutylisopropyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the silane composition is dicyclopentyldimethoxysilane (DCPDMS), methylcyclohexyldimethoxysilane (MChDMS), or n-propyltrimethoxysilane (NPTMS), and any combination of thereof.

In one embodiment, the external electron donor is dicyclopentyldimethoxysilane. In another embodiment, the external electron donor is n-propyltrimethoxysilane.

In an embodiment, the external electron donor can be a mixture of at least two alkoxysilanes. In a further embodiment, the mixture can be dicyclopentyldimethoxysilane with any combination of the following: methylcyclohexyldiethoxysilane, di-n-butyldimethoxysilane, diisobutyldiethoxysilane, n-propyltriethoxysilane, ethyltriethoxysilane, tetramethoxysilane, tetraethoxysilane, and combinations thereof.

In an embodiment, the external electron donor is selected from one or more of the following: a benzoate, a succinate, and/or a diol ester. In an embodiment, the external electron donor is 2,2,6,6-tetramethylpiperidine. In another embodiment, the external electron donor is a diether.

In an embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a diol ester, a poly(alkene glycol), a poly(alkene glycol) ester, and combinations thereof. The carboxylic acid ester can be an aliphatic or aromatic, mono- or poly-carboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

Nonlimiting examples of suitable polycarboxylic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, and di-2-ethyldecyl phthalate.

The aliphatic carboxylic acid ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ alkyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a myristate, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl triester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, the activity limiting agent includes a diether. The diether can be any di-ether represented by the structure (VII) as previously disclosed.

In an embodiment, the activity limiting agent includes a succinate composition having the following structure (VIII):

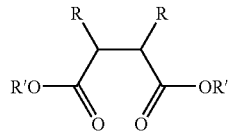

(VIII)

wherein R and R' may be the same or different, R and/or R' including one or more of the following groups: linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (IX):

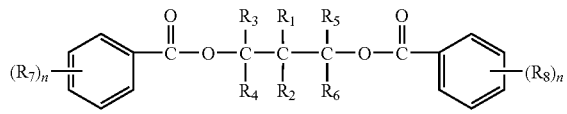

(IX)

wherein n is an integer from 1 to 5. $R_1$ and $R_2$, may be the same or different, and each may be selected from hydrogen, methyl, ethyl, n-propyl, i-propyl, n-butyl, t-butyl, allyl, phenyl, or halophenyl group. $R_3$, $R_4$, $R_5$, $R_6$, $R_7$, and $R_8$, may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. Any of $R_1$-$R_6$ groups may be linked to form a cyclic structure. $R_7$ and $R_8$, may be the same or different, and may be bonded to any carbon atom of the 2-, 3-, 4-, 5-, and 6-position of the phenyl ring.

In an embodiment, the external electron donor and the activity limiting agent can be added into the reactor separately. In another embodiment, the external electron donor and the activity limiting agent can be mixed together in advance and then added into the reactor as a mixture. In the mixture, more than one external electron donor or more than one activity limiting agent can be used. In an embodiment, the mixture is dicyclopentyldimethoxysilane and isopropyl myristate, dicyclopentyldimethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane and isopropyl myristate and combinations thereof.

In an embodiment, the catalyst composition includes any of the foregoing external electron donors in combination with any of the foregoing activity limiting agents.

The present catalyst composition may comprise two or more embodiments disclosed herein.

In an embodiment, a process for producing an olefin-based polymer is provided. The process includes contacting an olefin with a catalyst composition under polymerization conditions. The catalyst composition includes a multiple internal electron donor comprising a silyl ester. The multiple internal electron donor can be any multiple internal electron donor as disclosed herein. The process further includes forming an olefin-based polymer.

In an embodiment, the catalyst composition includes a procatalyst composition and a cocatalyst. The procatalyst composition may be any procatalyst composition as disclosed herein. The procatalyst composition may include a multiple internal electron donor as disclosed herein. The cocatalyst may be any cocatalyst as disclosed herein. The catalyst composition may optionally include an external electron donor and/or an activity limiting agent as previously disclosed.

In an embodiment, the olefin-based polymer can be a propylene-based olefin, an ethylene-based olefin, and combinations thereof. In an embodiment, the olefin-based polymer is a propylene-based polymer.

One or more olefin monomers can be introduced into a polymerization reactor to react with the catalyst and to form a polymer, (or a fluidized bed of polymer particles). Nonlimiting examples of suitable olefin monomers include ethylene, propylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, polymerization reactor.

In an embodiment, polymerization occurs by way of gas phase polymerization. As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

In an embodiment, the contacting occurs by way of feeding the catalyst composition into the polymerization reactor and introducing the olefin into the polymerization reactor. In an embodiment, the process includes contacting the olefin with a cocatalyst. The cocatalyst can be mixed with the procatalyst composition (pre-mix) prior to the introduction of the procatalyst composition into the polymerization reactor. In another embodiment, cocatalyst is added to the polymerization reactor independently of the procatalyst composition. The independent introduction of the cocatalyst into the polymerization reactor can occur simultaneously, or substantially simultaneously, with the procatalyst composition feed.

In an embodiment, the process includes mixing the external electron donor (and optionally the activity limiting agent) with the procatalyst composition. The external electron donor can be complexed with the cocatalyst and mixed with the procatalyst composition (pre-mix) prior to contact between the catalyst composition and the olefin. In another embodiment, the external electron donor and/or the activity limiting agent can be added independently to the polymerization reactor. In an embodiment, the external electron donor is dicyclopentyldimethoxysilane or n-propyltrimethoxysilane.

In another embodiment, the catalyst composition includes dicyclopentyldimethoxysilane or n-propyltrimethoxysilane and an activity limiting agent such as isopropyl myristate.

In an embodiment, a polypropylene homopolymer is produced in a first reactor. The content of the first reactor is subsequently transferred to a second reactor into which ethylene (and optionally propylene) is introduced. This results in production of a propylene-ethylene copolymer (an impact copolymer) in the second reactor.

In an embodiment, a polypropylene homopolymer is formed via introduction of propylene and any of the present procatalyst compositions, cocatalysts, external electron donors, and activity limiting agents in the first reactor. The polypropylene homopolymer is introduced into the second reactor along with ethylene (and optionally propylene) and optionally an external electron donor and/or optionally an activity limiting agent. The external electron donor and the activity limiting agent may be the same as or different from the respective components used in the first reactor. This produces a propylene-ethylene copolymer (such as an impact copolymer) in the second reactor.

In an embodiment, the olefin is propylene. The process includes forming a propylene-based polymer having a melt flow rate (MFR) from about 0.01 g/10 min to about 800 g/10 min, or from about 0.1 g/10 min to about 200 g/10 min, or from about 0.5 g/10 min to about 150 g/10 min. In a further embodiment, the propylene-based polymer is a polypropylene homopolymer.

In an embodiment, the olefin is propylene. The process includes forming a propylene-based polymer having a xylene solubles content from about 0.5% to about 10%, or from about 1% to about 8%, or from about 1% to about 4%. In a further embodiment, the propylene-based polymer is a polypropylene homopolymer.

In an embodiment, the olefin is propylene. The process includes forming a propylene-based polymer having a polydispersity index (PDI) from about 4 to about 20, or from about 5 to about 20, or from about 6 to about 15, or from about 4 to about 8. In a further embodiment, the propylene-based polymer is a polypropylene homopolymer.

In an embodiment, the olefin is propylene. The process includes forming a propylene-based polymer having a flexural modulus from about 200 kpsi to about 400 kpsi, or from about 220 kpsi to about 390 kpsi, or from about 230 kpsi to about 350 kpsi, or from about 240 kpsi to about 320 kpsi. In a further embodiment, the propylene-based polymer is a polypropylene homopolymer.

Applicants have surprisingly and unexpectedly discovered that the presence of the mixed internal electron donor in the catalyst composition improves hydrogen response and catalyst activity during polymerization and production of propylene-based polymers in particular, the formant polymers exhibiting improved properties. As used herein, "hydrogen response" refers to the sensitivity of the catalyst composition to chain transfer with hydrogen. A catalyst composition with a "high" hydrogen response requires less hydrogen to achieve a desired polymer molecular weight. A catalyst composition with a "low" or "poor" hydrogen response requires more hydrogen to achieve the same desired polymer molecular weight. A catalyst composition with high hydrogen response is advantageous as it can (1) achieve high MFR that may be impossible using conventional catalyst composition due to equipment limitation or adverse effect of high $H_2$ partial pressure on production rate, and (2) reduces time required to transit from one $H_2$ partial pressure to a different $H_2$ partial pressure.

The improved hydrogen response provided by the present procatalyst compositions advantageously enable the production of olefin-based polymers (particularly propylene-based polymers) with high melt flow rate. For example, catalyst compositions containing the present procatalyst compositions exhibit a high hydrogen response and advantageously enable the production of higher melt flow propylene-based olefins when compared to catalyst compositions with solely a silyl ester internal electron donor.

In addition, Applicants have further surprisingly and unexpectedly discovered that the present catalyst compositions with the mixed internal electron donor produce propylene-based polymers with higher flexural modulus when compared to propylene-based polymers produced from a catalyst with only a phthalate internal electron donor. In an embodiment, a propylene-based polymer produced with a present catalyst composition (with the multiple internal electron donor) has a flexural modulus value that is from about 4% to about 15%, or from about 5% to about 10% greater than the flexural modulus value of a propylene-based polymer produced from a catalyst composition with a single-component internal electron donor that is a phthalate.

The present polymerization process may comprise two or more embodiments disclosed herein.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term, "ethylene/α-olefin interpolymer," as used herein, refers to an interpolymer that comprises a majority weight percent polymerized ethylene monomer (based on the total amount of polymerizable monomers), and at least one polymerized α-olefin.

The term, "propylene-based polymer," as used herein, refers to a polymer that comprises a majority weight percent polymerized propylene monomer (based on the total amount of polymerizable monomers), and optionally may comprise at least one polymerized comonomer.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, 2-propenyl (or allyl), vinyl, n-butyl, t-butyl, i-butyl (or 2-methylpropyl), etc. The alkyls have 1 and 20 carbon atoms.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

Test Methods

Flexural modulus is determined in accordance with ASTM D790-00.

Melt flow rate (MFR) is measured in accordance with ASTM D 1238-01 test method at 230° with a 2.16 kg weight for propylene-based polymers.

Xylene Solubles (XS) is measured using a $^1$H NMR method as described in U.S. Pat. No. 5,539,309, the entire content of which is incorporated herein by reference.

Polydispersity Index (PDI) is measured by an AR-G2 rheometer which is a stress control dynamic spectrometer manufactured by TA Instruments using a method according to Zeichner G R, Patel P D (1981) "A comprehensive Study of Polypropylene Melt Rheology" Proc. of the $2^{nd}$ World Congress of Chemical Eng., Montreal, Canada. An ETC oven is used to control the temperature at 180° C.±0.1° C. Nitrogen is used to purge the inside of the oven to keep the sample from degradation by oxygen and moisture. A pair of 25 mm in diameter cone and plate sample holder is used. Samples are compress molded into 50 mm×100 mm×2 mm plaque. Samples are then cut into 19 mm square and loaded on the center of the bottom plate. The geometries of upper cone is (1) Cone angle: 5:42:20 (deg:min:sec); (2) Diameter: 25 mm; (3) Truncation gap: 149 micron. The geometry of the bottom plate is 25 mm cylinder.

Testing Procedure

The cone & plate sample holder are heated in the ETC oven at 180° C. for 2 hours. Then the gap is zeroed under blanket of nitrogen gas.

Cone is raised to 2.5 mm and sample loaded unto the top of the bottom plate.

Start timing for 2 minutes.

The upper cone is immediately lowered to slightly rest on top of the sample by observing the normal force.

After two minutes the sample is squeezed down to 165 micron gap by lower the upper cone.

The normal force is observed. When the normal force is down to <0.05 Newton the excess sample is removed from the edge of the cone and plate sample holder by a spatula.

The upper cone is lowered again to the truncation gap which is 149 micron.

An Oscillatory Frequency Sweep test is performed under these conditions:
  i. Test delayed at 180° C. for 5 minutes.
  ii. Frequencies: 628.3 r/s to 0.1 r/s.
  iii. Data acquisition rate: 5 point/decade.
  iv. Strain: 10%

When the test is completed the crossover modulus (Gc) is detected by the Rheology Advantage Data Analysis program furnished by TA Instruments.

PDI=100,000÷Gc (in Pa units).

By way of example and not by limitation, examples of the present disclosure will now be provided.

1. Silyl Esters

Silyl diol esters are prepared as set forth in co-pending U.S. patent application Ser. No. 61/117,820 filed on Nov. 25, 2008, the entire content of which is incorporated by reference herein. Nonlimiting examples of suitable silyl diol esters are set forth in Table 2 below.

TABLE 2

Silyl diol esters (SDE)

| Compound | Structure |
|---|---|
| Bis(benzoyloxy)dimethylsilane (SDE 1) | |

TABLE 2-continued

Silyl diol esters (SDE)

| Compound | Structure |
|---|---|
| Bis(benzoyloxy)diethylsilane (SDE 2) | |
| Bis(benzoyloxy)ethylmethylsilane (SDE 3) | |
| Bis(benzoyloxy)-isobutylmethylsilane (SDE 4) | |

2. Procatalyst Preparation.

In a flask with bottom filtration under $N_2$ atmosphere, 2.00 g of a SHAC™ 310 catalyst (BenMag precursor made from a MagTi procatalyst precursor and an ethyl benzoate internal electron donor; made according to Example 2 in U.S. Pat. No. 6,825,146, the entire content of which is incorporated herein by reference) or 3.00 g of mixed magnesium/titanium component (a MagTi precursor prepared according to example 1 in U.S. Pat. No. 6,825,146) is treated with internal electron donor(s) (amount for each internal electron donor is specified in Table 3 and Table 5) and 60 ml of a $TiCl_4$ solution in chlorobenzene (mcb) ($TiCl_4$/mcb 50/50 vol/vol) with stirring at 250 rpm at 115° C. for 60 minutes. The solution is filtered and the remaining solid is treated with 60 ml of the $TiCl_4$ solution with stirring at 250 rpm at 115° C. for 60 minutes. Additional internal electron donor is added at the beginning of the $TiCl_4$-treatment if required. This process is repeated once. Afterward, the solid procatalyst is washed with 70 ml of iso-octane at ambient temperature for 3 times and dried with a $N_2$ flow for 2 hours.

TABLE 3

Procatalyst compositions with SDE/phthalate ester mixed internal electron donor

| Procatalyst Type | Description (mmol) | Procatalyst # | Ti (%) | OEt (%) | DiBP (%) | SDE (%) | EB (%) |
|---|---|---|---|---|---|---|---|
| 1 | SDE 1 (2.52)/SHAC ™ 310 | 2521-19-2 | 3.27 | 0.11 | | NM | 0.20 |
| | | 2549-8-3 | 2.44 | NM | | NM | NM |
| | | 1332-46-1 | 2.62 | 0.17 | | 15.12 | 0.39 |
| 2 | SDE 1 (1.26) + DiBP (1.26)/SHAC ™ 310 | 2521-19-4 | 2.90 | NM | NM | NM | NM |
| 3 | SDE 1 (0.88) + DiBP (1.64)/SHAC ™ 310 | 1332-47-1 | 2.89 | 0.10 | 8.78 | 6.93 | 0.29 |
| 4 | SDE 1 (0.50) + DiBP (2.02)/SHAC ™ 310 | 1332-47-2 | 3.45 | 0.12 | 0.27 | | 11.39 |
| 5 | SDE 1(0.25) + DiBP (2.27)/SHAC ™ 310 | 1332-47-3 | 3.56 | 0.11 | | | 9.11 |
| 6 | SDE 1 (0.13) + DiBP (2.39)/SHAC ™ 310 | 1332-47-4 | 3.17 | 0.12 | | | 8.14 |
| 7* | DiBP (2.52)/SHAC ™ 310 | 2549-8-4 | 3.90 | NM | NM | | NM |
| | | 1332-45-4 | 3.80 | 0.11 | 20.59 | | 1.27 |
| | | 2521-19-3 | 3.49 | 0.11 | 17.62 | | 1.00 |

*= Comparative
SDE 1 = silyl diol ester (from Table 2)
NM = Not Measured
SHAC ™ 310 = MagTi with ethyl benzoate internal electron donor (BenMag)
DiBP = diisobutyl phthalate
EB = ethyl benzoate
OEt = ethoxide
(%) = weight percent based on total weight of procatalyst composition 3. Polymerization Procedure.

Polymerization with the procatalyst compositions of Table 3 and Table 5 is performed in liquid propylene in a 1-gallon autoclave. After conditioning, the reactors are charged with 1375 g of propylene and a targeted amount of hydrogen and brought to 62° C. External electron donor (either DCPDMS or NPTMS) is added to a 0.27-M triethylaluminum solution in isooctane a 5.0 wt % catalyst slurry in mineral oil (as indicated in data tables below) and premixed at ambient temperature for 20 minutes before being injected into the reactor to initiate the polymerization. The premixed catalyst components are flushed into the reactor with isooctane using a high pressure catalyst injection pump. After the exotherm, the temperature is controlled to 67° C. Total polymerization time is 1 hour.

Table 4A provides catalyst performance data with DCPDMS as the external electron donor. FIG. 1 is a graph showing hydrogen response and polymer melt flow rate for the catalyst compositions in Table 4A. Table 4B provides catalyst performance data with NPTMS as the external electron donor. Polymer properties are provided in Table 4C.

TABLE 4A

Catalyst Performance using DCPDMS

| Procatalyst Type | Run Number | Procatalyst # | EED | Procatalyst (mg) | TEAl (mmol) | Al/EED | $H_2$ (scc) | Activity (kg/g-hr) | BD (g/cc) | MFR | XS (%) |
|---|---|---|---|---|---|---|---|---|---|---|---|
| 1 | B-7081 | 2521-19-2 | DCPDMS | 16.34 | 2.00 | 8 | 7480 | 24.1 | 0.39 | 9.39 | 3.18 |
|   | A-7233 | 1332-46-1 | DCPDMS | 16.07 | 2.00 | 8 | 5000 | 31.8 | 0.39 | 3.27 | 3.21 |
|   | B-7079 | 2521-19-2 | DCPDMS | 16.34 | 2.00 | 8 | 3740 | 27.9 | 0.41 | 1.13 | 3.52 |
|   | C-6865 | 2521-19-2 | DCPDMS | 16.34 | 1.00 | 4 | 1870 | 22.3 | 0.38 | 0.93 | 2.40 |
|   | G-6970 | 2549-8-3 | DCPDMS | 11.80 | 2.00 | 8 | 7400 | 29.0 | 0.41 | 5.60 | 3.18 |
|   | H-5939 | 2549-8-3 | DCPDMS | 11.80 | 2.00 | 8 | 5000 | 28.4 | 0.40 | 4.12 | 3.11 |
| 2 | G-6859 | 2521-19-4 | DCPDMS | 17.40 | 2.00 | 8 | 7480 | 26.4 | 0.42 | 9.53 | 3.56 |
|   | F-6155 | 2521-19-4 | DCPDMS | 17.40 | 2.00 | 8 | 3740 | 28.2 | 0.42 | 1.14 | 1.17 |
|   | G-6810 | 2521-19-4 | DCPDMS | 17.40 | 1.00 | 4 | 1870 | 28.0 | 0.40 | VL | 2.21 |
| 3 | A-7238 | 1332-47-1 | DCPDMS | 15.13 | 2.00 | 8 | 4500 | 38.9 | 0.39 | 4.19 | 3.18 |
|   | H-5987 | 1332-47-1 | DCPDMS | 15.13 | 2.00 | 8 | 1870 | 33.6 | 0.42 | 0.27 | 2.93 |
|   | C-7055 | 1332-47-1 | DCPDMS | 10.26 | 2.00 | 8 | 3000 | 33.3 | 0.40 | 3.60 | 3.22 |
| 4 | B-7183 | 1332-47-2 | DCPDMS | 16.50 | 2.00 | 8 | 4500 | 34.8 | 0.39 | 6.63 | 3.53 |
|   | F-6292 | 1332-47-2 | DCPDMS | 11.19 | 2.00 | 8 | 3000 | 28.3 | 0.41 | 3.90 | 3.32 |
| 5 | G-6998 | 1332-47-3 | DCPDMS | 11.23 | 2.00 | 8 | 3000 | 29.6 | 0.41 | 8.12 | 3.68 |
| 6 | F-6254 | 1332-47-4 | DCPDMS | 16.85 | 2.00 | 8 | 4500 | 42.5 | 0.39 | 5.50 | 2.92 |
| 7* | A-7236 | 2549-8-4 | DCPDMS | 17.40 | 2.00 | 8 | 2000 | 28.9 | 0.40 | 2.58 | 3.78 |
|   | F-6247 | 1332-45-4 | DCPDMS | 17.09 | 2.00 | 8 | 1870 | 36.9 | 0.39 | 1.77 | 3.61 |
|   | E-5626 | 2521-19-3 | DCPDMS | 16.36 | 1.00 | 4 | 1870 | 24.9 | 0.38 | 2.99 | 3.73 |
|   | C-7013 | 1332-45-4 | DCPDMS | 11.39 | 2.00 | 8 | 1870 | 35.5 | 0.39 | 11.05 | 4.25 |
|   | H-5950 | 1332-45-4 | DCPDMS | 11.39 | 2.00 | 8 | 850 | 28.9 | 0.40 | 2.53 | 3.59 |
|   | H-5779 | 1332-45-4 | DCPDMS | 11.39 | 2.00 | 8 | 900 | 27.1 | 0.40 | 2.28 | 3.28 |
|   | H-5949 | 2549-8-4 | DCPDMS | 9.30 | 2.00 | 8 | 1300 | 33.0 | 0.41 | 3.26 | 3.19 |

*= Comparative
DCPDMS = dicyclopentyldimethoxysilane
EED = external electron donor
TEAl = triethyl aluminum
XS = xylene solubles
BD = bulk density
EB = ethyl benzoate
MFR = melt flow rate, g/10 minutes
VL = Very Low

TABLE 4B

Catalyst Performance Using NPTMS

| Procatalyst Type | Run Number | Procatalyst # | EED | Procatalyst (mg) | TEAl (mmol) | Al/EED | $H_2$ (scc) | Activity (kg/g-hr) | BD (g/cc) | MFR | XS (%) |
|---|---|---|---|---|---|---|---|---|---|---|---|
| 1 | A-7136 | 2521-19-2 | NPTMS | 16.34 | 2.00 | 8 | 5600 | 21.0 | 0.40 | 5.34 | 2.75 |
|   | A-7134 | 2521-19-2 | NPTMS | 16.34 | 2.00 | 8 | 2800 | 23.5 | 0.41 | 0.41 | 2.63 |
|   | D-7572 | 2521-19-2 | NPTMS | 16.34 | 1.00 | 4 | 1400 | 22.1 | 0.39 | <0.22 | 1.88 |
| 2 | C-6914 | 2521-19-4 | NPTMS | 17.40 | 2.00 | 8 | 2800 | 23.4 | 0.43 | 1.52 | 1.99 |
| 3 | A-7287 | 1332-47-1 | NPTMS | 15.13 | 2.00 | 8 | 1400 | 28.8 | 0.42 | 0.73 | 1.53 |
| 4 | A-7323 | 1332-47-2 | NPTMS | 15.60 | 2.00 | 8 | 350 | 7.9 | 0.42 | 0.29 | 1.95 |
| 5 | B-7270 | 1332-47-3 | NPTMS | 16.56 | 2.00 | 8 | 500 | 7.6 | 0.42 | 1.21 | 3.09 |
| 7* | F-6106 | 2521-19-3 | NPTMS | 16.36 | 1.00 | 4 | 1400 | 19.7 | 0.39 | 4.85 | 3.69 |

*= Comparative
DCPDMS = dicyclopentyldimethoxysilane
EED = external electron donor
NPTMS = n-propyltrimethoxysilane
XS = xylene solubles
BD = settled bulk density
EB = ethyl benzoate
MFR = melt flow rate, g/10 minutes
TEAl = triethyl aluminum Polymer properties for polymers produced from the procatalysts from Tables 4A, 4B are provided in Table 4C. FIG. 1 illustrates H₂ response for the procatalysts with different ratios of silyl diol ester to phthalate when about the same amount of procatalyst was used (~13 mg) with DCPDMS as external electron donor.

TABLE 4C

Polymer Properties

| Procatalyst Type | Run Number | Procatalyst # | EED | MFR | XS (%) | PDI | Modulus (kpsi; 72 hr) |
|---|---|---|---|---|---|---|---|
| 1 | A-7233 | 1332-46-1 | DCPDMS | 3.27 | 3.21 | | 248.4 |
|   | G-6970 | 2549-8-3 | DCPDMS | 5.60 | 3.18 | 7.03 | |
| 3 | C-7055 | 1332-47-1 | DCPDMS | 3.60 | 3.22 | 6.46 | 262.1 |
| 4 | G-6998 | 1332-47-3 | DCPDMS | 8.12 | 3.68 | 6.00 | 249.9 |
| 5 | G-6998 | 1332-47-3 | DCPDMS | 8.12 | 3.68 | 6.00 | 249.9 |
| 7* | H-5950 | 1332-45-4 | DCPDMS | 2.53 | 3.59 | 4.96 | 231.4 |
|    | H-5979 | 1332-45-4 | DCPDMS | 2.28 | 3.28 | 5.06 | 232.2 |

*= Comparative
DCPDMS = dicyclopentyldimethoxysilane
EED = external electron donor
NPTMS = n-propyltrimethoxysilane
TEAl = triethyl aluminum
BD = settled bulk density
EB = ethyl benzoate
MFR = melt flow rate, g/10 minutes
PP = propylene-based olefin produced (kg)/catalyst composition (g)/hr
XS = xylene solubles The data in Tables 3-4C demonstrate that a multiple internal electron donor comprising a silyl diol ester and a phthalic acid ester improves hydrogen response while maintaining or improving high catalyst activity. The propylene-based polymers produced therefrom exhibit low xylene solubles content, higher modulus, and broader molecular weight distribution compared to propylene-based polymers produced from catalyst compositions made from SHAC™ 310 as procatalyst precursor and diisobutyl phthalate internal electron donor.

TABLE 5

Procatalyst compositions with SDE/monocarboxylic acid ester mixture of internal electron donors

| ID # | Precursor | Donor Addition at 1st Halogenation (TiCl₄) (mmol) | Donor Addition at 2nd Halogenation (TiCl₄) (mmol) | Donor Addition at 3rd Halogenation (TiCl₄) (mmol) | Ti (%) | OEt (%) | DiBP (%) | SDE 1 (%) | EB (%) |
|---|---|---|---|---|---|---|---|---|---|
| 2549-8-1 | MagTi | SDE 1: 2.42 | | | 2.33 | NM | | NM | NM |
| 1264-55-3 | MagTi | SDE 1: 2.11 | | | NM | NM | | NM | NM |
| 1332-65-1 | SHAC ™ 310 | SDE 1: 2.42 | | | 2.43 | 0.16 | | 14.76 | 0.03 |
| 1264-68-1 | SHAC ™ 310 | SDE 1: 2.54 | | | 2.43 | 0.31 | | 13.59 | 2.64 |
| 1332-65-2 | MagTi | SDE 1: 2.42/EB: 2.50 | | | 2.07 | 0.35 | | 21.37 | 0.13 |
| 1264-68-2 | MagTi | SDE 1: 2.53/EB: 2.50 | | | 2.14 | 0.35 | | 16.68 | 1.87 |
| 1264-68-3 | MagTi | SDE 1: 2.53/EB: 1.67 | | | 2.11 | 0.38 | | 16.53 | 1.33 |
| 1264-69-1 | MagTi | SDE 1: 1.26/EB: 1.25 | | | 2.62 | 0.34 | | 12.27 | 3.28 |
| 1264-69-2 | MagTi | SDE 1: 1.89/EB: 1.67 | | | 2.29 | 0.30 | | 16.67 | 1.98 |
| 1264-69-3 | MagTi | SDE 1: 1.89/EB: 0.70 | | | 2.36 | 0.19 | | 14.40 | 1.71 |
| 1332-66-1 | MagTi | SDE 1: 2.42/EB: 2.78 | EB: 2.78 | | 2.35 | 0.26 | | 16.15 | 12.32 |
| 1332-65-3 | MagTi | SDE 1: 2.42/EB: 2.78 | EB: 2.78 | EB: 2.78 | 2.40 | 0.35 | | 18.54 | 0.03 |
| 1332-66-2 | MagTi | EB: 2.78 | SDE 1: 2.42 | | 3.47 | 0.40 | | 13.86 | 1.15 |
| 1264-54-2 | MagTi | SDE 1: 2.11/BC: 3.02 | | | 1.82 | 0.19 | | 16.98 | 1.53 |
| 1264-55-1 | MagTi | SDE 1: 2.11/BA: 1.15 | | | NM | NM | NM | NM | NM |
| 1264-54-1 | MagTi | SDE 1: 2.11/EA: 2.56 | | | 2.10 | 0.24 | | 15.72 | 0.52 |
| 1264-54-3 | MagTi | SDE 1: 2.11/EBB: 2.51 | | | 2.23 | 0.30 | | 8.45 | 0.31 |
| 1264-54-4 | MagTi | SDE 1: 2.11/PB: 2.50 | | | 1.48 | 0.18 | | 15.59 | 0.41 |
| *1264-68-4 | MagTi | DiBP: 2.42 | | | 2.75 | 0.34 | 15.66 | | |
| *1264-69-4 | MagTi | DiBP: 2.42 | | | 3.09 | 0.25 | 12.13 | | |

*= Comparative
BC = benzoyl chloride
EB = ethyl benzoate
NM = Not Measured

TABLE 5-continued

Procatalyst compositions with SDE/monocarboxylic acid ester mixture of internal electron donors

| ID # | Precursor | Donor Addition at 1st Halogenation (TiCl$_4$) (mmol) | Donor Addition at 2$^{nd}$ Halogenation (TiCl$_4$) (mmol) | Donor Addition at 3$^{rd}$ Halogenation (TiCl$_4$) (mmol) | Ti (%) | OEt (%) | DiBP (%) | SDE 1 (%) | EB (%) |
|---|---|---|---|---|---|---|---|---|---|

PB = propyl benzoate
SHAC ™ 310 = (BenCat)-MagTi precursor with ethyl benzoate internal electron donor
BA = benzoic anhydride
DiBP = diisobutyl phthalate
EBB = ethyl p-bromobenzoate
OEt = ethoxide
SDE 1 = silyl diol ester (from Table 2)
(%) = weight percent based on total weight of procatalyst composition Tables 6A, 6B, 6C, and 6D provide catalyst performance data and resultant polymer properties for catalyst compositions incorporating the procatalyst compositions of Table 5.

TABLE 6A

| ID # (Table 5) | EED | BD (g/cc) | MFR (g/10 min) | XS (%) | Activity (kg/g-hr) | Procatalyst (mg) | TEAl (mmol) | EED (mmol) | Al/EED | H$_2$ (scc) | PDI |
|---|---|---|---|---|---|---|---|---|---|---|---|
| 2549-8-1 | DCPDMS | 0.31 | 1.9 | 5.0 | 11.8 | 17.4 | 2.00 | 0.25 | 8.00 | 2000 | 5.38 |
| 1264-55-3 | NPTMS | | 2.9 | 2.1 | 5.7 | 16.7 | 1.71 | 0.25 | 6.84 | 3000 | 5.78 |
| 1264-55-3 | DCPDMS | | 2.4 | 2.0 | 5.3 | 16.7 | 1.71 | 0.25 | 6.84 | 4000 | 5.72 |
| 1332-65-1 | DCPDMS | 0.43 | 1.2 | 4.3 | 17.1 | 16.7 | 2.00 | 0.25 | 8.00 | 1870 | |
| 1332-65-1 | DCPDMS | 0.44 | 0.9 | 3.8 | 15.1 | 16.7 | 1.71 | 0.25 | 6.84 | 1870 | |
| 1332-65-1 | DCPDMS | 0.34 | 2.3 | 3.3 | 18.5 | 16.7 | 1.71 | 0.25 | 6.84 | 4000 | 6.61 |
| 1332-65-1 | DCPDMS | 0.37 | 8.6 | 4.6 | 19.2 | 17.4 | 2.00 | 0.25 | 8.00 | 5000 | 6.79 |
| 1332-65-1 | NPTMS | 0.42 | 0.7 | 3.6 | 10.5 | 16.7 | 1.71 | 0.25 | 6.84 | 1200 | |
| 1332-65-1 | NPTMS | 0.22 | 2.3 | 2.5 | 11.9 | 16.7 | 1.71 | 0.25 | 6.84 | 3000 | 6.39 |
| 1264-68-1 | DCPDMS | 0.30 | 2.7 | 3.2 | 19.1 | 17.4 | 2.00 | 0.25 | 4.00 | 3000 | 6.24 |
| 1264-68-1 | DCPDMS | 0.31 | 8.5 | 3.1 | 21.7 | 17.4 | 2.00 | 0.25 | 4.00 | 6000 | 6.18 |
| *1264-68-4 | DCPDMS | 0.35 | 4.6 | 2.6 | 33.5 | 17.4 | 2.00 | 0.25 | 4.00 | 3000 | |
| *1264-68-4 | DCPDMS | 0.41 | 3.5 | 2.2 | 23.8 | 11.6 | 2.00 | 0.25 | 4.00 | 2000 | 4.60 |
| *1264-68-4 | DCPDMS | 0.40 | 10.0 | 2.2 | 22.9 | 11.6 | 2.00 | 0.25 | 4.00 | 4000 | 4.87 |
| *1264-68-4 | DCPDMS | 0.36 | 12.6 | 2.3 | 36.1 | 17.4 | 2.00 | 0.25 | 4.00 | 6000 | |
| *1264-69-4 | NPTMS | 0.40 | 5.0 | 2.1 | 13.6 | 11.6 | 2.00 | 0.25 | 4.00 | 800 | 3.82 |
| *1264-69-4 | DCPDMS | 0.40 | 2.4 | 2.1 | 19.5 | 11.6 | 2.00 | 0.25 | 4.00 | 1250 | 4.42 |

* = Comparative
DCPDMS = dicyclopentyldimethoxysilane
NPTMS = n-propyltrimethoxysilane
BD = settled bulk density
EED = external electron donor

TABLE 6B

| ID # (Table 5) | EED | BD (g/cc) | MF (g/10 min) | XS (%) | Activity (kg/g-hr) | Procatalyst (mg) | TEAl (mmol) | EED (mmol) | Al/EED | H$_2$ (scc) | PDI |
|---|---|---|---|---|---|---|---|---|---|---|---|
| 1332-65-2 | DCPDMS | 0.30 | 0.6 | 2.6 | 12.8 | 16.7 | 1.71 | 0.25 | 6.84 | 1870 | |
| 1332-65-2 | DCPDMS | 0.30 | 1.7 | 2.4 | 13.4 | 16.7 | 1.71 | 0.25 | 6.84 | 4000 | 6.21 |
| 1332-65-2 | DCPDMS | 0.34 | 3.4 | 2.9 | 9.5 | 17.4 | 2.00 | 0.25 | 8.00 | 5000 | 6.85 |
| 1332-65-2 | NPTMS | 0.31 | 0.4 | 2.5 | 12.3 | 16.7 | 1.71 | 0.25 | 6.84 | 1200 | |
| 1332-65-2 | NPTMS | 0.39 | 1.7 | 1.4 | 10.0 | 16.7 | 1.71 | 0.25 | 6.84 | 3000 | 6.16 |
| 1224-68-2 | DCPDMS | 0.27 | 1.6 | 2.0 | 13.2 | 17.4 | 2.00 | 0.25 | 4.00 | 3000 | 6.31 |
| 1264-68-2 | DCPDMS | 0.25 | 7.2 | 1.9 | 14.6 | 17.4 | 2.00 | 0.25 | 4.00 | 6000 | 6.29 |

BD = settled bulk density
EED = external electron donor
DCPDMS = dicyclopentyldimethoxysilane
NPTMS = n-propyltrimethoxysilane A multiple internal electron donor comprising a silyl diol ester and a benzoic acid ester (see Table 6B) improves catalyst activity and stereoselectivity (low XS) compared to the catalysts with silyl diol ester only and lacking benzoic acid ester in the internal electron donor (Table 6A). Catalysts with the multiple internal electron donor of silyl ester/benzoic acid ester also yield a propylene-based olefin with broad MWD (high PDI value). Compare Table 6A (internal donor is silyl ester only, no benzoic acid ester) to the data of Table 6B (multiple internal electron donor comprising a silyl diol ester and a benzoic acid ester).

TABLE 6C

| ID # (Table 5) | EED | BD (g/cc) | MF (g/10 min) | XS (%) | Activity (kg/g-hr) | Procatalyst (mg) | TEAl (mmol) | EED (mmol) | Al/EED | H$_2$ (scc) | PDI |
|---|---|---|---|---|---|---|---|---|---|---|---|
| 1264-68-3 | DCPDMS | 0.25 | 1.8 | 2.2 | 14.3 | 17.4 | 2.00 | 0.25 | 4.00 | 3000 | 6.35 |
| 1264-68-3 | DCPDMS | 0.28 | 7.4 | 2.3 | 13.8 | 17.4 | 2.00 | 0.25 | 4.00 | 6000 | 6.38 |
| 1264-69-1 | DCPDMS | 0.29 | 2.0 | 2.4 | 22.7 | 17.4 | 2.00 | 0.25 | 4.00 | 3000 | 6.07 |
| 1264-69-1 | DCPDMS | 0.33 | 10.0 | 2.8 | 25.2 | 17.4 | 2.00 | 0.25 | 4.00 | 6000 | 5.98 |
| 1264-69-2 | DCPDMS | 0.25 | 1.6 | 1.5 | 15.3 | 17.4 | 2.00 | 0.25 | 4.00 | 3000 | 6.17 |
| 1264-69-2 | DCPDMS | 0.30 | 7.4 | 1.8 | 16.2 | 17.4 | 2.00 | 0.25 | 4.00 | 6000 | 5.96 |
| 1264-69-3 | DCPDMS | 0.23 | 2.0 | 1.9 | 13.0 | 17.4 | 2.00 | 0.25 | 4.00 | 3000 | 6.57 |
| 1264-69-3 | DCPDMS | 0.23 | 11.6 | 1.7 | 14.0 | 17.4 | 2.00 | 0.25 | 4.00 | 6000 | 6.38 |
| 1332-66-1 | DCPDMS |  | 9.0 | 4.1 | 6.1 | 17.4 | 2.00 | 0.25 | 8.00 | 5000 | 6.89 |
| 1332-65-3 | DCPDMS |  | 4.8 | 4.1 | 7.1 | 17.4 | 2.00 | 0.25 | 8.00 | 5000 | 7.13 |
| 1332-66-2 | DCPDMS | 0.39 | 5.8 | 4.4 | 20.1 | 17.4 | 2.00 | 0.25 | 8.00 | 5000 | 6.41 |

BD = settled bulk density
EED = external electron donor
DCPDMS = dicyclopentyldimethoxysilane
NPTMS = n-propyltrimethoxysilane Catalyst activity and/or catalyst stereoselectivity can be further improved by adjusting the total amount of internal donors and/or adjusting the ratio of benzoic acid ester to silyl diol ester. This can be accomplished by adding the internal electron donor(s) at different steps. Adding ethyl benzoate during multiple halogenation steps broadens MWD (Table 6C).

TABLE 6D

| ID # (Table 5) | EED | BD (g/cc) | MF (g/10 min) | XS (%) | Activity (kg/g-hr) | Procatalyst (mg) | TEAl (mmol) | EED (mmol) | Al/EED | H$_2$ (scc) | PDI |
|---|---|---|---|---|---|---|---|---|---|---|---|
| 1264-54-2 | NPTMS | 0.39 | 2.3 | 1.7 | 12.3 | 16.7 | 1.71 | 0.25 | 6.84 | 3000 | 5.74 |
| 1264-54-2 | DCPDMS | 0.40 | 1.7 | 2.8 | 13.9 | 16.7 | 1.71 | 0.25 | 6.84 | 3000 | 5.72 |
| 1264-55-1 | DCPDMS |  | 4.5 | 1.8 | 13.6 | 17.4 | 2.00 | 0.25 | 4.00 | 5000 | 6.20 |
| 1264-54-1 | NPTMS | 0.38 | 2.5 | 2.9 | 7.0 | 16.7 | 1.71 | 0.25 | 6.84 | 3000 | 5.73 |
| 1264-54-3 | NPTMS |  | 3.3 | 1.2 | 6.8 | 16.7 | 1.71 | 0.25 | 6.84 | 3000 | 5.78 |
| 1264-54-3 | DCPDMS | 0.36 | 3.0 | 2.7 | 8.6 | 16.7 | 1.71 | 0.25 | 6.84 | 3000 | 6.07 |
| 1264-54-4 | NPTMS |  | 2.6 | 2.0 | 5.3 | 16.7 | 1.71 | 0.25 | 6.84 | 3000 | 5.95 |
| 1264-54-4 | DCPDMS | 0.38 | 2.1 | 2.8 | 7.2 | 16.7 | 1.71 | 0.25 | 6.84 | 3000 | 6.11 |

BD = settled bulk density
EED = external electron donor
DCPDMS = dicyclopentyldimethoxysilane
NPTMS = n-propyltrimethoxysilane Other benzoate esters (acyl chloride and anhydride compounds) also improve catalyst performance and polymer properties when included as a component of the multiple internal electron donor, along with a silyl diol ester (Table 6D).

The data in Tables 5-6D show that catalyst compositions with a multiple internal electron donor comprising a silyl diol ester and a benzoic acid ester improve hydrogen response while maintaining or improving high catalyst activity and/or catalyst stereoselectivity. The propylene-based polymer produced therefrom exhibit low xylene solubles and broad molecular weight distribution.

Table 7 provides procatalyst data and Table 8 provides catalyst performance data and resultant polymer properties for procatalyst catalyst compositions incorporating the procatalyst compositions of Table 7.

TABLE 7

Procatalyst compositions with SDE/diether mixed internal electron donor

| Procatalyst # | Precursor | Donor Addition at 1$^{st}$ TiCl$_4$ Contacting (mmol) | Ti (%) | OEt (%) | SDE (%) | Diether (%) | EB (%) |
|---|---|---|---|---|---|---|---|
| 1910-4-1 | MagTi | SDE 1: 1.89/DE1: 0.63 | 2.07 | 0.22 | 7.72 | 2.76 | 0.58 |
| 1910-4-2 | MagTi | SDE 1: 1.26/DE1: 1.26 | 2.01 | 0.24 | 6.51 | 6.34 | 0.17 |
| 1910-5-2 | MagTi | SDE 1: 0.63/DE1: 1.89 | 3.56 | 0.30 | 3.47 | 12.42 | 0.12 |
| *1910-5-4 | MagTi | DE1: 2.52 | 4.02 | 0.34 | 0 | 16.67 | 0 |
| 4949-64-1 | MagTi | SDE 1: 1.89/DE2: 0.63 | 2.99 | 0.17 | 9.13 | 1.58 | 0.43 |
| 4949-64-2 | MagTi | SDE 1: 1.26/DE2: 1.26 | 2.66 | 0.18 | 7.47 | 3.99 | 0.17 |
| 4949-64-3 | MagTi | SDE 1: 0.63/DE2: 1.89 | 2.91 | 0.29 | 3.55 | 6.82 | 0.10 |

TABLE 7-continued

Procatalyst compositions with SDE/diether mixed internal electron donor

| Procatalyst # | Precursor | Donor Addition at 1st TiCl4 Contacting (mmol) | Ti (%) | OEt (%) | SDE (%) | Diether (%) | EB (%) |
|---|---|---|---|---|---|---|---|
| 4949-64-4 | MagTi | SDE 1: 0.25/DE2: 2.27 | 3.56 | NM | NM | NM | NM |
| *1332-21-1 | MagTi | DE2: 2.52 | 3.69 | 0.33 | 0 | 16.63 | 0 |

*= Comparative
DE2 = 3,3-bis(methoxymethyl)-2,5-dimethylhexane
OEt = ethoxide
DE1 = 1,3-dicyclohexyl-2,2-bis(methoxymethyl)propane
NM = Not Measured
SDE 1 = silyl diol ester (from Table 2)

TABLE 8

| Procatalyst # | EED | Procatalyst (mg) | TEAl (mmol) | Al/EED | H2 (scc) | Activity (kg/g-hr) | BD | MF (g/10 min) | XS (%) | PDI |
|---|---|---|---|---|---|---|---|---|---|---|
| 1910-4-1 | NPTMS | 15.7 | 2 | 8 | 6000 | 13.8 | 0.29 | 5.3 | 1.54 | 5.79 |
| | DCPDMS | 15.7 | 2 | 8 | 10000 | 14.7 | 0.25 | 12.7 | 2.61 | 5.67 |
| 1910-4-2 | NPTMS | 15.4 | 2 | 8 | 6000 | 25.2 | 0.30 | 5.1 | 1.18 | 5.83 |
| | DCPDMS | 15.4 | 2 | 8 | 10000 | 32.6 | 0.32 | 14.0 | 3.09 | 5.72 |
| 1910-5-2 | NPTMS | 15.8 | 2 | 8 | 6000 | 32.7 | 0.31 | 13.7 | 2.27 | 5.88 |
| | DCPDMS | 15.8 | 2 | 8 | 10000 | 32.2 | 0.32 | 36.7 | 3.78 | 5.33 |
| *1910-5-4 | NPTMS | 16.4 | 2 | 8 | 1000 | 24.9 | 0.27 | 11.6 | 4.27 | 4.50 |
| | DCPDMS | 16.4 | 2 | 8 | 1500 | 30.4 | 0.30 | 16.0 | 5.82 | 4.48 |
| 4949-64-1 | NPTMS | 7.9 | 2 | 8 | 6000 | 17.9 | 0.30 | 7.1 | 1.62 | 5.44 |
| | DCPDMS | 7.9 | 2 | 8 | 10000 | 12.4 | 0.30 | 9.2 | 2.14 | 5.71 |
| | None | 7.9 | 2 | | 6000 | 23.9 | 0.32 | 11.0 | 4.86 | 5.73 |
| 4949-64-2 | NPTMS | 7.9 | 2 | 8 | 6000 | 36.8 | 0.32 | 7.2 | 1.34 | 5.03 |
| | DCPDMS | 7.9 | 2 | 8 | 10000 | 28.2 | 0.30 | 13.1 | 2.17 | 5.14 |
| | None | 7.9 | 2 | | 6000 | 57.0 | 0.35 | 14.2 | 4.17 | 4.92 |
| 4949-64-3 | NPTMS | 8.1 | 2 | 8 | 6000 | 26.2 | 0.25 | 17.6 | 0.97 | |
| | DCPDMS | 5.7 | 2 | 8 | 10000 | 14.1 | 0.26 | 46.2 | 2.48 | |
| | None | 5.7 | 2 | | 6000 | 60.9 | 0.26 | 37.8 | 4.12 | |
| 4949-64-4 | NPTMS | 16.7 | 2 | 8 | 1000 | 26.9 | 0.29 | 2.6 | 2.26 | 4.41 |
| | DCPDMS | 16.7 | 2 | 8 | 1500 | 27.4 | 0.27 | 3.3 | 3.83 | 4.58 |
| *1332-21-1 | NPTMS | 11.6 | 2 | 8 | 600 | 39.4 | 0.32 | 4.8 | 2.42 | 3.63 |
| | DCPDMS | 11.6 | 2 | 8 | 600 | 42.6 | 0.34 | 2.9 | 2.91 | 3.63 |
| | None | 11.6 | 2 | | 600 | 46.9 | 0.34 | 6.6 | 4.40 | 3.60 |

*= Comparative
DCPDMS = dicyclopentyldimethoxysilane
NPTMS = n-propyltrimethoxysilane
BD = bulk density
EED = external electron donor
None = no external electron donor used The data in Tables 7-8 show that catalyst compositions with a multiple internal electron donor comprising a silyl diol ester and a diether improve hydrogen response while maintaining or improving high catalyst activity, particularly when compared to polymers formed with catalysts containing solely a silyl diol ester internal donor. The propylene-based polymers produced also exhibit low xylene solubles and broad molecular weight distribution.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A catalyst composition comprising: a procatalyst composition comprising a multiple internal electron donor comprising a silyl ester and an electron donor component wherein the silyl ester has the structure

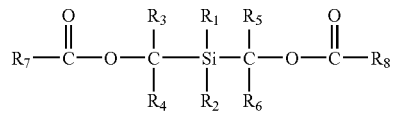

wherein $R_1$-$R_8$ are the same or different and each is selected from the group consisting of hydrogen, a substituted hydrocarbyl group having 1 to 20 carbon atoms, an unsubstituted hydrocarbyl group having 1 to 20 carbon atoms, and combinations thereof, each of $R_7$ and $R_8$ is selected from a benzene-ring-containing group; and a cocatalyst.

2. The catalyst composition of claim 1 wherein the procatalyst composition comprises a combination of a magnesium moiety, a titanium moiety, and a multiple internal electron donor comprising the silyl ester and an electron donor component.

3. The catalyst composition of claim 1 comprising a silyl diol ester of the structure

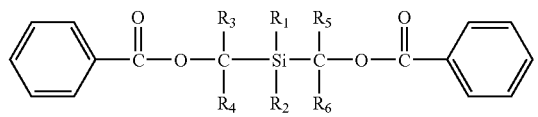

wherein $R_3$-$R_6$ are hydrogen, $R_1$ and $R_2$ are the same or different and each is selected from the group consisting of hydrogen, and a $C_1$-$C_6$ alkyl group.

4. The catalyst composition of claim 1 comprising an electron donor component selected from the group consisting of a benzoic acid ester and a phthalic acid ester.

5. The catalyst composition of claim 1 wherein the multiple internal electron donor comprises a silyl diol ester and a phthalic acid ester.

6. The catalyst composition of claim 1 wherein the multiple internal electron donor comprises a silyl diol ester and a benzoic acid ester.

7. The catalyst composition of claim 1 wherein the multiple internal electron donor comprises a silyl diol ester and a diether.

8. The catalyst composition of claim 1 comprising a member selected from the group consisting of an external electron donor, an activity limiting agent, and combinations thereof.

9. The catalyst composition of claim 8 comprising an external electron donor selected from the group consisting of dicyclopentyldimethoxysilane, methylcyclohexyldimethoxysilane, n-propyltrimethoxysilane, and combinations thereof.

10. The catalyst composition of claim 8 comprising an activity limiting agent selected from the group consisting of a carboxylic acid ester, a diether, a poly(alkene glycol), a diol ester, and combinations thereof.

11. A catalyst composition comprising: a procatalyst composition comprising a multiple internal electron donor comprising a silyl ester and an electron donor component wherein the silyl ester has the structure

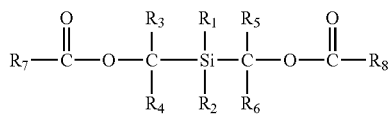

wherein $R_1$-$R_8$ are the same or different and each is selected from the group consisting of hydrogen, a substituted hydrocarbyl group having 1 to 20 carbon atoms, an unsubstituted hydrocarbyl group having 1 to 20 carbon atoms, and combinations thereof, each of $R_7$ and $R_8$ is selected from a benzene-ring-containing group;

a diether selected from a group consisting of 1,3 dicyclohexyl-2,2-bis(methoxymethyl)propane, 3,3-bis(methoxymethyl)-2,5-dimethylhexane, and combinations thereof; and a cocatalyst.

12. A catalyst composition comprising: a procatalyst composition comprising a multiple internal electron donor comprising a silyl ester and an electron donor component wherein the silyl ester has the structure

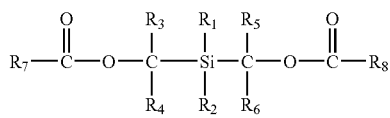

wherein $R_1$-$R_8$ are the same or different and each is selected from the group consisting of hydrogen, a substituted hydrocarbyl group having 1 to 20 carbon atoms, an unsubstituted hydrocarbyl group having 1 to 20 carbon atoms, and combinations thereof, each of $R_7$ and $R_8$ is selected from a benzene-ring-containing group;

from about 0.1 wt % to about 15.0 wt % ethyl benzoate; and a cocatalyst.

* * * * *